(12) United States Patent
Yu et al.

(10) Patent No.: US 11,417,872 B2
(45) Date of Patent: Aug. 16, 2022

(54) POROUS INORGANIC INSULATOR-SULFUR COMPOSITE, AND LITHIUM-SULFUR BATTERY COMPRISING THE SAME

(71) Applicants: DAEGU GYEONGBUK INSTITUTE OF SCIENCE & TECHNOLOGY, Daegu (KR); GLOBAL FRONTIER CENTER FOR MULTISCALE ENERGY SYSTEMS, Seoul (KR)

(72) Inventors: Jong Sung Yu, Seoul (KR); Byong-June Lee, Busan (KR)

(73) Assignee: DAEGU GYEONGBUK INSTITUTE OF SCHIENCE & TECHNOLOGY, Daegu (KR)

( * ) Notice: Subject to any disclaimer, the term of this patent is extended or adjusted under 35 U.S.C. 154(b) by 158 days.

(21) Appl. No.: 16/514,750

(22) Filed: Jul. 17, 2019

(65) Prior Publication Data

US 2020/0044239 A1 Feb. 6, 2020

(30) Foreign Application Priority Data

Jul. 18, 2018 (KR) ........................ 10-2018-0083705

(51) Int. Cl.
| | | |
|---|---|---|
| H01M 4/36 | (2006.01) | |
| H01M 4/62 | (2006.01) | |
| H01M 4/38 | (2006.01) | |
| H01M 10/052 | (2010.01) | |
| H01M 4/02 | (2006.01) | |

(52) U.S. Cl.
CPC ............. *H01M 4/362* (2013.01); *H01M 4/38* (2013.01); *H01M 4/625* (2013.01); *H01M 10/052* (2013.01); *H01M 2004/021* (2013.01); *H01M 2004/028* (2013.01)

(58) Field of Classification Search
CPC ............ H01M 4/36; H01M 4/62; H01M 4/38; H01M 10/052
See application file for complete search history.

(56) References Cited

U.S. PATENT DOCUMENTS 3,953,231 A * 4/1976 Farrington ............ H01M 10/36
429/320
6,302,928 B1 * 10/2001 Xu ..................... H01M 10/0525
29/623.1

(Continued)

FOREIGN PATENT DOCUMENTS

| KR | 20160051055 A | 5/2016 |
|---|---|---|
| KR | 20160061033 A | 5/2016 |

OTHER PUBLICATIONS

"Tubular titanium oxide/reduced graphene oxide-sulfur composite for improved performance of lithium sulfur batteries", Song et al., Carbon 128 (6861), Nov. 2017.*

(Continued)

*Primary Examiner* — Kenneth J Douyette
(74) *Attorney, Agent, or Firm* — Harness, Dickey & Pierce, P.L.C.

(57) ABSTRACT

Provided are a porous inorganic insulator-sulfur composite and a lithium-sulfur battery including the same. More particularly, provided are a composite having sulfur supported in pores of a porous inorganic insulator, a cathode for lithium-sulfur batteries or an interlayer, which includes the composite, and a lithium-sulfur battery including the cathode or the interlayer.

17 Claims, 22 Drawing Sheets

(56) References Cited

U.S. PATENT DOCUMENTS

| | | | |
|---|---|---|---|
| 2007/0027015 A1* | 2/2007 | Zhou | C04B 35/46 |
| | | | 501/17 |
| 2012/0184433 A1* | 7/2012 | Yang | H01M 4/485 |
| | | | 502/439 |
| 2017/0033406 A1* | 2/2017 | Zhang | H01M 10/0569 |
| 2017/0170511 A1* | 6/2017 | Yu | H01M 10/052 |
| 2018/0070633 A1* | 3/2018 | Phillips | H01M 4/525 |

OTHER PUBLICATIONS

"Rechargeable Lithium-Sulfur Batteries with High Sulfur-Loading Electrodes", Graduate Theses, Dissertations, and Problem Reports. 6995; Jianhua Yan, 2015. https://researchrepository.wvu.edu/etd/6995.*

* cited by examiner

FIG. 14B
$TiO_{2-x}$
(b)
FIG. 14C
TiO, 5h
reduction time
(c)
FIG. 14D
TiO, 8h
reduction time
(d)
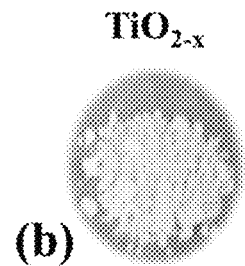
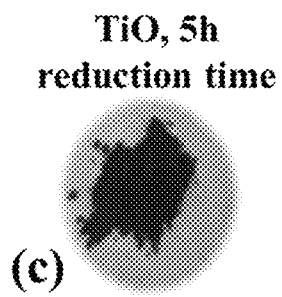
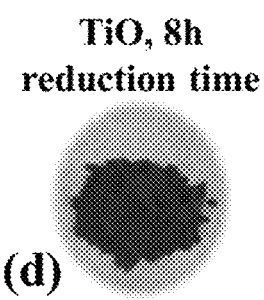

POROUS INORGANIC INSULATOR-SULFUR COMPOSITE, AND LITHIUM-SULFUR BATTERY COMPRISING THE SAME

CROSS-REFERENCE TO RELATED APPLICATIONS

This application claims priority under 35 U.S.C. § 119 to Korean Patent Application No. 10-2018-0083705, filed on Jul. 18, 2018, in the Korean Intellectual Property Office, the disclosure of which is incorporated herein by reference in its entirety.

TECHNICAL FIELD

The following disclosure relates to porous inorganic insulator-sulfur composite and lithium-sulfur battery including the same, and more particularly, to composite having sulfur supported in the pores of a porous inorganic insulator, a cathode for the lithium-sulfur batteries or an interlayer, which includes the composite, and a lithium-sulfur battery including the cathode or the interlayer.

BACKGROUND

As various environmental issues have come into the spotlight, the car industry is actively developing hybrid or electric vehicles which are driven by environmentally friendly electric energy, which is gradually replacing fossil fuel, and there is a rapidly increasing demand for an energy storage device capable of being carried and used for a long time even in various electronic products such as electronic devices, communication devices, and the like, which have been prepared in miniaturized and lightweight fashions.

In the industry field requiring such an energy storage device, one goal is to develop a battery having a high energy density and high power output. Lithium secondary batteries most widely used currently are remarkably getting the spotlight because the lithium secondary batteries have a high energy density and a high standard electrode potential.

A lithium-sulfur (Li—S) battery is a battery using a sulfur-based material having a sulfur-sulfur bond (an S—S bond) as a cathode active material and a lithium metal as an anode active material. The lithium-sulfur battery has a theoretical energy density of 2,600 Wh/kg or 2,800 Wh/L, which is much higher than the theoretical energy densities (Ni-MH battery: 450 Wh/kg, Li—FeS battery: 480 Wh/kg, Li—$MnO_2$ battery: 1,000 Wh/kg, and Na—S battery: 800 Wh/kg) of other battery systems which are currently being studied. With regard to the specific capacity, the lithium-sulfur (Li—S) battery is also one of the batteries which is currently being developed the most in that the batteries have a high specific capacity of 1,675 mAh/g when a reaction between sulfur and lithium proceeds theoretically.

Sulfur used in a cathode of the lithium-sulfur battery has advantages in that it has an abundant resource, exhibits no toxicity, and has a low weight per atom and a stable operating voltage of approximately 2.1 V. In spite of these excellent advantages of sulfur, the cycle capability and rate capability of the lithium-sulfur battery still stay in the low level. This is because sulfur is lost while being dissolved in an electrolyte. More specifically, during a discharge reaction of the lithium-sulfur battery, an oxidation reaction of lithium occurs in an anode, and a reduction reaction of sulfur occurs in a cathode. Sulfur prior to the discharge has a ring-shaped $S_8$ structure. In this case, the oxidation number of S decreases as an S—S bond breaks during a reduction (discharge) reaction, resulting in an electrochemical reaction in which the ring-shaped $S_8$ is converted into lithium polysulfides ($Li_2S_x$ where x=8, 6, 4, and 2) having a linear structure by means of a reduction reaction. Among the lithium polysulfides generated through the electrochemical reaction, a lithium polysulfide ($Li_2S_x$, where x is greater than or equal to 4) having a high oxidation number of sulfur is easily dissolved in an electrolyte solution. Then, the lithium polysulfide dissolved in the electrolyte solution is diffused far (in a direction of an anode) from a cathode in which the lithium polysulfide is generated due to its concentration difference. In this case, because the lithium polysulfide eluted from the cathode is lost out of a cathodic reaction zone, the gradual reduction into lithium sulfide ($Li_2S$) is impossible although the cathode is charged. That is, because the lithium polysulfide present in a dissolved state outside of the cathode does not participate in a charge/discharge reaction of a battery, a quantity of a sulfur material participating in an electrochemical reaction is reduced in the cathode, which mainly results in decreased charge capacity and energy of the lithium-sulfur battery.

Another reason is due to the low electrical conductivity of sulfur. In this case, because sulfur has a low electrical conductivity of $5\times10^{-30}$ S/cm at 25° C., a conductive host material is essentially required to use it as a cathode material of the battery. The conductive host material should have a high specific surface area and a pore volume. In this case, a carbon body having a hollow pore structure, graphene, a porous carbon body, and the like may be used as such a material. As the conductive host material, the porous or hollow carbon body may come into contact with sulfur to improve electrical conductivity. However, because the carbon body basically has a non-polar nature, and the lithium polysulfide has polarity, the carbon body and the lithium polysulfide have a very low affinity for each other. Therefore, as the sulfur is reduced into the lithium polysulfide, the host material is lost in an electrolyte in a direction of an anode without maintaining the lithium polysulfide in the cathodic reaction zone, resulting in degraded cycling stability.

To solve the above problems, there is an attempt to introduce a metal oxide, which can strongly interact with the lithium polysulfide, to suppress the loss of sulfur and coat a carbon body with a polymer coating layer. However, a preparation process is complicated, the rate capability and cycling stability still need to be improved, and thus the fundamental issues remain to be solved. Accordingly, there is a continuous demand for development of cathode materials that may remarkably increase a quantity of supported sulfur, may minimize the loss of sulfur, and has a simple preparation process.

PRIOR-ART DOCUMENTS

Patent Documents

Korean Patent Publication No. 2016-0061033
Korean Patent Publication No. 2016-00510552호

SUMMARY

An embodiment of the present invention is directed to providing a porous inorganic insulator-sulfur composite capable of stably supporting a large quantity of sulfur because the porous inorganic insulator-sulfur composite has a high pore volume.

Another embodiment of the present invention is directed to providing a porous inorganic insulator-sulfur composite capable of minimizing the loss of sulfur during a charge/discharge cycle because the porous inorganic insulator-sulfur composite has a potent interaction with sulfur without including a carbon body and a metal oxide, and to providing a cathode and an interlayer including the same.

Still another embodiment of the present invention is directed to providing a cathode having a high energy density, a high areal capacity, and a high volumetric capacity, an interlayer, and to providing a lithium-sulfur battery including the same.

Yet another embodiment of the present invention is directed to providing a lithium-sulfur battery having improved lifetime characteristics and capable of allowing the design of a flexible structure.

Yet another embodiment of the present invention is directed to providing a lithium-sulfur battery having high cycle stability and rate capability.

Yet another embodiment of the present invention is directed to providing a method of preparing a material for cathodes and interlayers, which may be prepared at low cost due to a simple preparation process, and thus has high economic feasibility.

In one general aspect, a porous inorganic insulator-sulfur composite according to the present invention includes a porous inorganic insulator; and sulfur supported in pores of the porous inorganic insulator.

The non-conductive porous inorganic insulator may have a BET specific surface area of 5 m$^2$/g or more, and may include mesopores having a diameter of less than 2 to 50 nm or macropores having a diameter of 50 to 2,000 nm.

The porous inorganic insulator may be a porous inorganic insulator-sulfur composite that is porous silica or porous titania.

The sulfur may be included at 0.4 mg/m$^2$ to 30 mg/m$^2$ in the pores of the porous inorganic insulator.

The sulfur may include inorganic sulfur ($S_8$), a sulfur-based compound, or a mixture thereof.

The porous inorganic insulator-sulfur composite may have diffraction peaks of the sulfur and the porous inorganic insulator present at the same time in an X-ray diffraction (XRD) pattern using Cu Kα.

The porous inorganic insulator may have a hexagonal flat structure having a thickness of 100 to 3,000 nm.

In another general aspect, a cathode for lithium-sulfur batteries according to the present invention includes a porous inorganic insulator; and sulfur supported in pores of the porous inorganic insulator.

The cathode may further include a carbon-based conductor.

The cathode may include a porous inorganic insulator-sulfur composite and a carbon-based conductor a weight ratio of 10:10 to 10:0.1.

The cathode may include a cathode composite layer in which the carbon-based conductor, the porous inorganic insulator-sulfur composite, and a binder are physically mixed and complexed.

In still another general aspect, a lithium-sulfur battery according to the present invention may include the aforementioned cathode for lithium-sulfur batteries; an anode; an electrolyte; and a separator.

The cathode may include a current collector and a cathode composite layer formed on the current collector, and the cathode composite layer may include a cathode composite in which a carbon-based conductor, a porous inorganic insulator-sulfur composite, and a binder are physically mixed and complexed.

The lithium-sulfur battery may have a volumetric capacity of 450 mAh/cm$^3$ or more and an areal capacity of 3.5 mAh/cm$^2$ or more.

In yet another general aspect, a lithium-sulfur battery including a cathode; an anode; an electrolyte; and a separator according to the present invention includes an interlayer interposed between the cathode and the separator, and the interlayer may include a porous inorganic insulator.

The porous inorganic insulator may include sulfur supported in pores thereof.

The interlayer may include an interlayer composite in which a carbon-based conductor, a porous inorganic insulator-sulfur composite, and a binder are physically mixed and complexed.

The cathode may be used to provide a lithium-sulfur battery including the aforementioned cathode for lithium-sulfur batteries.

BRIEF DESCRIPTION OF THE DRAWINGS

FIGS. 14A-14D are digital images of porous titania.

DETAILED DESCRIPTION OF EMBODIMENTS

Figure 1:
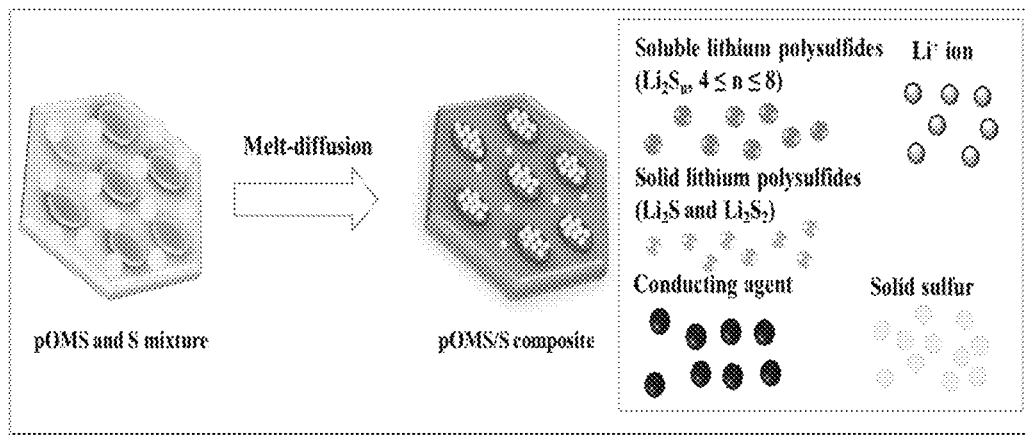
FIG. 1 is a diagram showing a method of preparing a porous silica-sulfur composite.

Hereinafter, a porous inorganic insulator-sulfur composite according to the present invention as well as cathode for lithium-sulfur batteries and a lithium-sulfur battery, both of which include the same, will be described in detail with reference to the accompanying drawings. The drawings presented herein below are shown as one example to sufficiently provide the scope of the present invention to those skilled in the art. Therefore, it should be understood that the present invention may be embodied in various forms, but is not intended to be limited to the drawings presented herein below. In this case, the drawings presented herein below may be shown in an exaggerated manner to make the scope of the present invention more clearly apparent. In this case, unless otherwise defined, all technical and scientific terms used herein have the same meaning as commonly understood by one of ordinary skill in the art to which the present invention pertains. In the following description and the accompanying drawings, a description of known functions and configurations, which unnecessarily obscure the subject matter of the present invention, will be omitted.

Also, the singular forms "a," "an," and "the" used in the specification of the present invention and the appended claims are intended to refer to those including plural referents unless the context clearly dictates otherwise.

In addition, the units used without any particular comments in the specification of the present invention and the appended claims are based on weight. For example, the units of % or percentage refer to a percent (%) by weight or weight percentage.

A porous inorganic insulator-sulfur composite according to the present invention includes a porous inorganic insulator; and sulfur supported in pores of the porous inorganic insulator.

The sulfur may be used without any particular limitation as long as the sulfur may be supported in the porous inorganic insulator. As one example, the sulfur may include inorganic sulfur ($S_8$), a sulfur-based compound, or a mixture thereof. As one specific example, the sulfur-based compound may include one or more selected from the group consisting of a metal sulfide ($M_xS_y$, M=Li, Ni, Co, Cu, Fe, Mo, Ti, Nb, $1 \leq x \leq 4$, and $1 \leq y \leq 8$), an organic sulfur compound, and a carbon-sulfur polymer ($(C_2S_x)_n$: x=2.5 to 50, and $n \geq 2$).

The porous inorganic insulator may be used without any particular limitation as long as it is electrochemically stable and is a non-conductive inorganic substance. As one example, the porous inorganic insulator may be a porous body formed of one or more inorganic substances selected from oxides, nitrides, carbides, or sulfides of one or more elements selected from metals and metalloids. Preferably, the porous inorganic insulator may be an oxide. As one specific example, the porous inorganic insulator may be a porous body of silica, alumina, magnesium oxide, titania, zirconia, tin dioxide, zinc oxide, or a mixture thereof. More particularly, silica may be preferably selected because the silica is an insulator having non-conductivity, may effectively form a mesoporous structure, and may strongly interact with sulfur having polarity.

To support sulfur in pores of the porous inorganic insulator, a 2-step melting-diffusion method may be used, and a method as shown in FIG. 1 may also be used. Referring to FIG. 1, when heat is applied to a mixture of sulfur and porous silica serving as a porous inorganic insulator, sulfur may melt and the melted sulfur may be impregnated into a pore structure of the porous silica. As shown in FIG. 1, sulfur molecules undergoing the melting-diffusion method may be supported in the pore structure at a high concentration, some of sulfur may be present in a state in which a surface of the porous silica is coated with the sulfur molecules.

The 2-step melting-diffusion method will be described in further detail, as follows. That is, sulfur may be effectively supported in pores of the porous inorganic insulator by mixing a porous inorganic insulator and sulfur powder and heating the resulting mixture to diffuse the melted sulfur into the pores of the porous inorganic insulator (first step); filling a first container with the heated and calcined material, and coupling the first container to an empty second container to seal the first and second containers (second step); and re-heating the coupled first and second containers under an inert gas atmosphere to diffuse sulfur into the pores of the porous inorganic insulator (third step).

In the first step, as one non-limiting example, the porous inorganic insulator and the sulfur powder may be pulverized and mixed to perform uniform mixing when mixed. In the first step, the heating temperature may be a temperature of 80 to 300° C., preferably a temperature of 100 to 200° C., and the heating time may be in a range of 5 to 60 hours, preferably 10 to 30 hours. The heating temperature and the heating time stated previously are just non-limiting examples to melt sulfur and diffuse the melted sulfur into the pores of the porous inorganic insulator. Therefore, the temperature and time are not limited thereto. The atmosphere in the first step may be an inert gas atmosphere, for example, a nitrogen atmosphere.

In the second step, when the first step is completed, the calcined mixture is transferred to the first container to fill the container, and an opening of the empty second container is couple to an opening of the first container to seal the openings. As the calcined mixture is closed and an empty space is secured through the second step, the sulfur may be effectively diffused into the pores of the porous inorganic insulator in the subsequent third step.

In the third step, the heating temperature may be a temperature of 150 to 400° C., preferably a temperature of 200 to 300° C., and the heating time may be in a range of 0.5 to 10 hours, preferably 1 to 5 hours. The heating temperature and the heating time stated previously are just non-limiting examples to diffuse the sulfur into the pores of the porous inorganic insulator in the closed container. Therefore, the temperature and time are not limited thereto. The atmosphere in the third step may be an inert gas atmosphere, for example, a nitrogen atmosphere. As described above, the sulfur may be effectively diffused into the pores of the porous inorganic insulator through the 2-step melting and diffusion consisting of the first and third steps, so that a high content of sulfur may be supported in the porous inorganic insulator since the pores of the porous inorganic insulator is effectively filled with the sulfur.

The porous inorganic insulator according to one embodiment of the present invention may have a non-conductive property. Because the sulfur has non-conductivity as the material itself, a carbon body having conductivity has been used so far as a conductive host material so as to use sulfur as the cathode material. In particular, to contain sulfur, a pore structure is developed in the carbon body to contain a large quantity of sulfur. However, because a non-polar carbon body and a polar lithium polysulfide have very low affinity for sulfur, the carbon body may not maintain the lithium polysulfide in a cathodic reaction zone when the sulfur is converted into the lithium polysulfide, and the lithium polysulfide may be easily lost by an electrolyte in a direction of an anode.

Surprisingly, it was found in the present invention that, when a non-conductive host is selected as a support for containing sulfur without using the conductive host material, and a porous inorganic insulator is used as a non-conductive host having a very potent affinity for sulfur, the lithium-sulfur battery may show high affinity for sulfur although a non-conductive host is used in a lithium-sulfur battery, and may show superior cycle capability, compared to the conventional lithium-sulfur batteries in which conductive host is used. That is, even when the sulfur is converted into a lithium polysulfide soluble in an electrolyte or is further reduced and converted into an insoluble lithium polysulfide during an electrochemical reaction of the sulfur caused by the high affinity between the sulfur and the porous inorganic insulator, the sulfur may be maintained in a cathodic reaction zone, thereby significantly decreasing the loss of sulfur. Contrary to the common concept that a host having conductivity should be used for use as a cathode material, the present invention suggests that the use of a non-conductive porous inorganic insulator rather allows the lithium-sulfur battery to show remarkable usefulness, and thus the non-conductive porous inorganic insulator may serve as a good host to both of the sulfur and polysulfide. The lithium polysulfide converted by the electrochemical reaction of sulfur may preferentially interact with the inorganic insulator having polarity and a pore structure to allow a preferential adsorption in or around the pores of the inorganic insulator, thereby effectively inhibiting the lithium polysulfide from being freely diffused in a direction of an anode.

Figure 2:
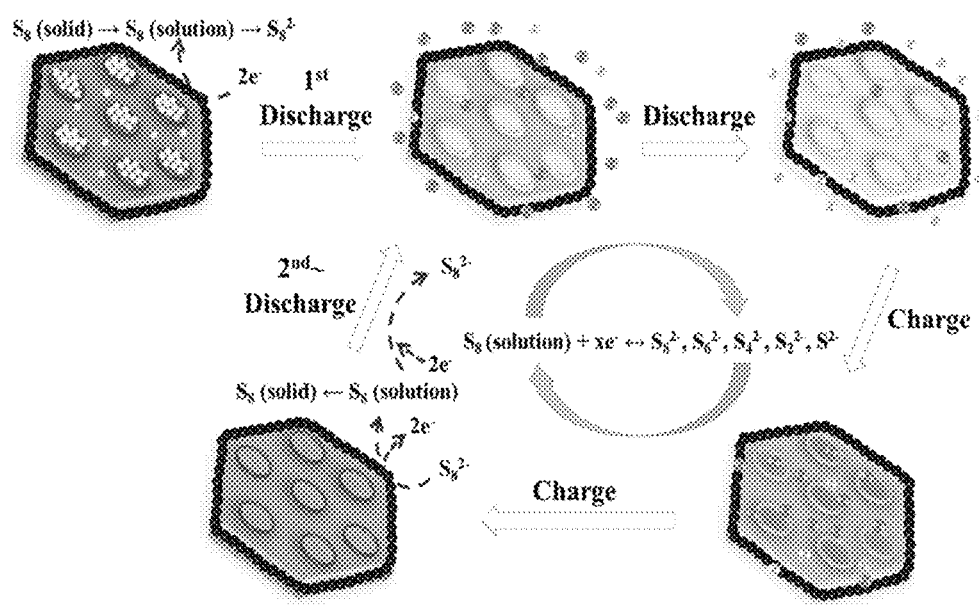
FIG. 2 is a diagram showing an electrochemical reaction of the porous silica-sulfur composite in a lithium-sulfur battery.

More specifically, referring to FIG. 2 in detail, when the porous inorganic insulator-sulfur composite is discharged, an electrochemical reduction reaction of the sulfur molecules present on a surface and in pores of the porous inorganic insulator is initiated. As shown in the drawing, a soluble lithium polysulfide is first generated, and then starts to be converted into an insoluble lithium polysulfide when the reduction reaction further proceeds. Most sulfur is continuously reduced during a discharge cycle, but the lithium polysulfide is not lost towards an anode but is positioned in or around the pores of silica due to the high affinity for silica.

In this case, when the lithium polysulfide is charged again, an electrochemical oxidation reaction of sulfur may be initiated, and thus the lithium polysulfide present in or around the pores of silica may be oxidized, which makes it possible to re-support sulfur in the pores of the porous inorganic insulator and coat a surface of the porous inorganic insulator with sulfur.

The porous inorganic insulator according to one embodiment of the present invention may have a BET specific surface area of 10 $m^2/g$ or more prior to supporting the sulfur. Specifically, the BET specific surface area of the porous inorganic insulator may be greater than or equal to 25 $m^2/g$, particularly greater than or equal to 300 $m^2/g$, and more particularly 600 to 1,200 $m^2/g$. When the porous inorganic insulator has a high specific surface area, a large quantity of sulfur may be impregnated or supported in a pore structure of the inorganic insulator. When a large quantity of sulfur is impregnated, the lithium-sulfur battery may exhibit superior electrochemical characteristics.

Specifically, the porous inorganic insulator may be a mesoporous or macroporous inorganic insulator including mesopores or macropores. In the mesoporous inorganic insulator, the mesopores are classified according to the IUPAC definitions: a pore having a diameter of less than 2 nm is referred to as a micropore, a pore having a diameter of 2 nm to 50 nm is referred to as a mesopore, and a pore having a diameter of greater than 50 nm is referred to as a macropore. When the mesoporous inorganic insulator includes mesopores, sulfur may be easily supported in the mesopores by means of a 2-step melting-diffusion method. More specifically, in the mesoporous inorganic insulator, the mesopores may have a pore diameter of 2 nm to 50 nm, and more particularly a pore diameter of 3 nm to 15 nm, but this numerical range is not limited thereto. The mesoporous inorganic insulator refers to an inorganic insulator in which the mesopores occupy most (50% by volume or more) of the pore volume, and the macroporous inorganic insulator refers to an inorganic insulator in which the macropores occupy most (50% by volume or more) of the pore volume.

The mesoporous inorganic insulator according to one embodiment of the present invention may include any one or more mesopore structures in which the distribution of mesopores (including mesopore channels) is selected from the group consisting of a hexagonal array and a cubic array. Preferably, the mesoporous inorganic insulator may have a hexagonal structure. The hexagonal mesoporous inorganic insulator has advantages in that the hexagonal mesoporous inorganic insulator has a high pore volume and an aligned pore structure at the same volume, and materials may be rapidly adsorbed and diffused due to the low tortuosity of the pores, and thus may be advantageous over the cubic porous inorganic insulators.

The hexagonal mesoporous inorganic insulator according to one embodiment of the present invention may be a hexagonal flat structure having a thickness of 100 to 3,000 nm, and more preferably may be a mesoporous inorganic insulator having a hexagonal flat structure.

Specifically, the flat structure may be a 2D structure in the form of a disk or platelet, and refers to a structure whose in-plane width is higher than the thickness thereof. The flat structure may have a thickness of 150 nm to 600 nm, and more particularly a thickness of 200 nm to 400 nm. In the hexagonal flat structure, the length of one side may be in a range of 300 nm to 3,000 nm, particularly 400 nm to 2,000 nm, and more particularly 600 nm to 1000 nm. In this case, the ratio of the in-plane width and the thickness may be in a range of 0.01 to 0.2, preferably 0.04 to 0.15. The channel length of the mesopores may get shorter when the mesoporous inorganic insulator has a flat structure in the form of a disk. Therefore, it is desirable that sulfur may be more easily supported in the mesopores, and the flat structure of the mesoporous inorganic insulator may have a higher surface area and pore volume, compared to rod-shaped silica having long mesopores. When the mesoporous inorganic insulator has a flat structure as will be described below, the mesoporous inorganic insulator may have high usefulness in the use of the cathode or interlayer of the lithium-sulfur battery. That is, when sulfur is supported in the flat mesoporous inorganic insulator, a surface of the inorganic insulator may also be coated with the sulfur. In this case, because the flat structure has a higher outer surface area due to the characteristics of the flat structure, a larger quantity of sulfur strongly interact with a surface of the inorganic insulator so that the surface of the inorganic insulator may be coated with sulfur in a physically adsorbed form. Also, when the sulfur present on a surface of the flat mesoporous inorganic insulator may be reduced so that the flat mesoporous inorganic insulator can be converted into a soluble lithium polysulfide, the soluble lithium polysulfide has a high outer surface area in which a polarity-polarity interaction may occur. Therefore, the reduced soluble lithium polysulfide may have an advantage in that the loss of sulfur may be reduced because the sulfur may be present on a surface of the flat mesoporous inorganic insulator. In terms of the preparation method, the mesoporous inorganic insulator having a hexagonal flat structure may especially use a simpler process to support sulfur, support a large quantity of sulfur in a shorter time, and support a larger quantity of sulfur due to the higher pore volume thereof.

In the porous inorganic insulator-sulfur composite according to one embodiment of the present invention, the sulfur may refer to sulfur supported in the pores of the porous inorganic insulator, as described above. Also, the sulfur may be sulfur with which not only the surface but also the pores of the porous inorganic insulator are coated. As one specific example, when the inorganic insulator is silica, a surface of the porous inorganic insulator may be coated with sulfur, thereby supporting a larger quantity of sulfur. Also, a polar surface of silica is not simply physically coated with sulfur having polarity, but the sulfur having polarity and the polar surface of silica may strongly interact with each other so that the sulfur can be coupled to the surface of silica. Therefore, when the sulfur present on the surface of silica is reduced so that the sulfur can be converted into a soluble lithium polysulfide, it is possible to preferentially adsorb the soluble lithium polysulfide in the vicinity of the surface of silica due to the polarity-polarity interaction. That is, although the sulfur present on the surface of silica is first reduced so that the sulfur can be converted into the soluble lithium polysulfide, the sulfur may be present in a cathodic reaction zone, resulting in decreased loss of sulfur. Also, the composite may exhibit excellent cycle capability even when a high content of sulfur is used.

When the sulfur is supported in the pores of the porous inorganic insulator, a quantity of the sulfur supported per area of the porous inorganic insulator pore may be in a range of 0.1 mg/m$^2$ or 0.4 mg/m$^2$ to 25 mg/m$^2$, preferably in a range of 1.5 mg/m$^2$ to 10 mg/m$^2$, and more preferably in a range of 2.5 mg/m$^2$ to 7.0 mg/m$^2$. When the sulfur is supported in this quantity range, most of the pores, preferably most of the mesopores, of the porous inorganic insulator may be supported with the sulfur.

When the pores of the porous inorganic insulator are supported with sulfur, the sulfur may be stably positioned in the pores, a crystalline state of the sulfur may be stably maintained due to the strong interaction between the sulfur and silica. As one example, the diffraction peaks of sulfur crystals and the porous inorganic insulator may be present at the same time in an X-ray diffraction (XRD) pattern using Cu Kα, indicating that the sulfur crystals are stably maintained in the pores of the porous inorganic insulator.

The porous inorganic insulator according to one embodiment of the present invention may have a pore volume of 0.2 cm$^3$/g or more prior to the supporting of the sulfur. Particularly, the pore volume of the porous inorganic insulator may be in a range of 0.8 to 2.6 cm$^3$/g, and more particularly in a range of 1.0 to 2.0 cm$^3$/g. However, the porous inorganic insulator-sulfur composite in which the sulfur is supported has a rapidly decreased pore volume because the sulfur supported is most of the pores present in the porous inorganic insulator. As one example, when the sulfur is supported in the porous inorganic insulator having a pore volume of 1.0 to 2.0 cm$^3$/g, the porous inorganic insulator may have a pore volume of 0.05 cm$^3$/g or less, particularly a pore volume of 0.01 cm$^3$/g or less, and more particularly a pore volume of 0.005 to 0.001 cm$^3$/g. As one example, the sulfur may be supported in 95% or more, particularly 98% or more, and more particularly 99.5% or more of the pore volume of the porous inorganic insulator.

The porous inorganic insulator according to one embodiment of the present invention may be porous silica. As a wall material, the porous silica may be silicon oxide ($SiO_2$), or silicon oxide substituted with a heteroelement, and refers to a material that includes a plurality of pores formed therein and has a high pore volume. One example of the silicon oxide substituted with the heteroelement may include silicates in which a portion of a silicon element is substituted with heteroelements such as Al, Ga, P, B, and the like, such as aluminum silicate, gallium silicate, silica phosphate, boron silicate, and the like. Also, porous silica substituted with various heteroelements falls within the scope of the present invention.

The porous silica according to one embodiment of the present invention may be mesoporous silica, and the mesoporous silica may include any one or more mesopore structures in which the distribution of mesopores is selected from the group consisting of a hexagonal array and a cubic array. As one specific example, the porous silica including the mesopore structure may be hexagonal porous silica having two-dimensional (2D) mesopores, such as SBA-15, MCM-41, and the like; cubic porous silica in which mesopores are developed in a 3D manner, such as MCM-48, SBA-1, SBA-16, SBA-12, FDU-12, KIT-6, and the like; or silica having a composite structure including both a hexagonal array and a cubic structure, such as SBA-2.

Also, the porous inorganic insulator according to one embodiment of the present invention may be porous titania. The porous titania may include mesopores, macropores, or a combination thereof, and may be present in the form of a polymorphic phase such as anatase, rutile, brookite, or a combination thereof.

The present invention provides the aforementioned porous inorganic insulator-sulfur composite as the cathode for lithium-sulfur batteries.

The cathode for lithium-sulfur batteries according to the present invention includes a porous inorganic insulator-sulfur composite, which includes a porous inorganic insulator and sulfur supported in pores of the porous inorganic insulator. For example, the porous inorganic insulator-sulfur composite may be used as a cathode active material layer, and may be positioned on a current collector. The current collector may be a metal having excellent conductivity, and one non-limiting example of the current collector may be selected from aluminum, nickel, copper, stainless steel, and the like, but the present invention is not limited thereto. As one preferred example, the metal of the current collector may be a metal coated with carbon.

The cathode for lithium-sulfur batteries according to one embodiment of the present invention may be material which may be mixed together with the porous inorganic insulator-sulfur composite, and may optionally further include a carbon-based conductor and a binder.

The carbon-based conductor is added to effectively induce an electrochemical reaction in the porous inorganic insulator-sulfur composite, and serves to allow electrons to smoothly move in the porous inorganic insulator-sulfur composite. One non-limiting example of the carbon-based conductor may include one or a mixture of two or more selected from a graphite-based material, graphene, carbon black, and a conductive polymer, but the present invention is not limited thereto. The graphite-based material may be any one or two or more selected from natural graphite, artificial graphite, and the like. The carbon-based material may be one or two or more selected from Super-P (commercially available from MMM), ketjen black, denka black, acetylene black, carbon black, and the like. Also, the conductive polymer may be one or two or more selected from a polyaniline-based polymer, a polythiophene-based polymer, a polyacetylene-based polymer, a polypyrrole-based polymer, and the like.

The shape of the carbon-based conductor is not limited in a range exerting adverse effects to the battery performance, and the carbon-based conductor may have a shape such as whisker, spherical, oval, or plate-shaped shapes.

The binder may be used for the purpose of physically coupling a porous inorganic insulator-sulfur composite and a carbon-based conductor to each other or attaching the porous inorganic insulator-sulfur composite and the carbon-based conductor to a current collector. The binder may be a polymer binder, and one example of the binder may include one or two or more selected from poly(vinyl acetate), polyvinyl alcohol, polyethylene oxide, polyvinyl pyrrolidone, alkylated polyethylene oxide, cross-linked polyethylene oxide, polyvinyl ether, poly(methyl methacrylate), poly-vinylidene fluoride, a copolymer of polyhexafluoropropylene and polyvinylidene fluoride, poly-ethyl acrylate), polytetrafluoroethylene, and derivatives, blends, and copolymers thereof, but the present invention is not limited thereto. One preferred example of the binder may be polyethylene oxide.

The cathode for lithium-sulfur batteries according to one embodiment of the present invention may include a cathode composite layer in which a carbon-based conductor, a porous inorganic insulator-sulfur composite, and a binder are physically mixed and complexed. As described above, the carbon-based conductor is a component that is different from the conductive host material, and the conductive host material is a material which supports sulfur using the high specific surface area and the pore volume, but the carbon-based conductor is a particulate material that is added to facilitate the transfer of electrons without having a high specific surface area or pore volume. Therefore, it may be enough to physically homogeneously mix the carbon-based conductor and the porous inorganic insulator-sulfur composite with the binder. The cathode for lithium-sulfur batteries may have a structure in which the cathode composite layer comes in direct contact with the current collector so that the cathode composite layer is stacked on the current collector.

The present invention includes a method of preparing a cathode composite layer for lithium-sulfur batteries, which includes the aforementioned porous inorganic insulator-sulfur composite.

According to one embodiment of the present invention, the method of preparing a cathode composite layer may include: a) dissolving a porous inorganic insulator-sulfur composite, a carbon-based conductor and a polymer binder is a solvent (first step); b) stirring the mixture dissolved in the solvent (second step); and c) casting the mixture on a base material and drying the solvent (third step). In the first step, the solvent may be a polar solvent, and one non-limiting example of the solvent may any one or more selected from acetonitrile, tetrahydrofuran, isopropyl alcohol, and methanol. In the second step, the stirring conditions may be 1 to 5 hours in a temperature range of 20 to 50° C., which is merely one non-limiting example. Therefore, the temperature and the time are not limited thereto. In the third step, the base material may be a current collector, and the current collector may be metal foil, as described above, or metal foil coated with carbon.

The cathode composite layer may be obtained by casting the mixture on the base material and drying the mixture. In this case, the thickness of the cathode composite layer may be adjusted according to the concentration of a mixture to be cast, and the recovery of the casting. The adjustment of the thickness becomes apparent to a person having ordinary skill in the arts, and thus a detailed description thereof is omitted.

When the current collector is included in the cathode, the whole thickness of the cathode including the current collector and the cathode composite layer may be in a range of 10 to 150 μm, preferably in a range of 30 to 120 μm, and more preferably in a range of 40 to 90 μm, and the thickness of the cathode composite layer except the current collector may be in a range of 5 to 100 μm, preferably in a range of 10 to 90 μm, and more preferably in a range of 20 to 80 μm.

In the cathode for lithium-sulfur batteries according to one embodiment of the present invention, the weight ratio of the porous inorganic insulator-sulfur composite and the carbon-based conductor may be in a range of 10:10 to 10:0.1, preferably in a range of 10:6 to 10:0.6, and more preferably in a range of 10:3 to 10:1.

The cathode for lithium-sulfur batteries may exhibit excellent stability and higher electrochemical performance in this weight ratio range. Specifically, the cathode for lithium-sulfur batteries may exhibit excellent cycle capability due to a small decrease in specific capacity even after a number of cycles.

The present invention provides a lithium-sulfur battery including the aforementioned porous inorganic insulator-sulfur composite as a cathode.

The lithium-sulfur battery according to the present invention includes a cathode, an anode, an electrolyte, and a separator, and the cathode includes a porous inorganic insulator-sulfur composite. A cathode composite layer including the mesoporous silica-sulfur composite as described above may be used as the cathode, or a cathode composite layer including the porous inorganic insulator-sulfur composite coupled onto the current collector may be used as the cathode. An anode active material may be used as the anode, or an anode active material coupled onto the current collector may be used as the anode. The anode active material may include any one selected from the group consisting of a material capable of reacting with lithium ions to reversibly form a lithium-containing compound, a lithium metal, and a lithium alloy. The material capable of reacting with lithium ions to reversibly form a lithium-containing compound may be a metal, a metal oxide, or a metal nitride. One specific example of the material may be tin oxide, titanium nitride, silicon (Si), and the like. As one specific example, an alloy of the lithium metal may be an alloy of lithium with Si, Al, Sn, Zn, Bi, Cd, Pb, Mg, Ga, or In, but the present invention is not limited thereto. The current collector that may be used in the anode may be any one selected from the group consisting of copper, aluminum, stainless steel, titanium, silver, palladium, nickel, an alloy thereof, and a combination thereof.

The separator is a physical separator that has a function to physically separate the cathode and the anode, and may be used without any particular limitation as long as the separator is generally used as the separator in lithium sulfur batteries. Specifically, a separator having excellent moisture retention ability for an electrolyte and low resistance to movement of lithium ions is preferred. More specifically, the separator may be a porous polymer separator, and examples of the separator may include an olefin-based homopolymer or copolymer, an olefin-acrylate copolymer, and the like. In this case, the separator may be used in the form of a single layer or a composite layer, which is merely one example. Therefore, the separator is not limited thereto.

The electrolyte is a medium in which lithium used in the anode or the anode active material is dissociated into lithium ions to move from an anode to a cathode so as to allow current to flow therethrough, and may be in the form of a liquid electrolyte or a solid electrolyte. The liquid electrolyte may include a non-aqueous organic solvent, and may further include a lithium salt. The non-aqueous organic solvent may be a polar solvent such as a sulfoxide-based compound, a sulfate-based compound, a sulfite-based compound, a lactone-based compound, a ketone-based compound, an ester-based compound, a carbonate-based compound, an ether-based compound, or the like. One non-limiting example of the non-aqueous organic solvent may be ethylene carbonate, tetrahydrofuran, 1,4-dioxane, 1,3-dioxolane, dimethyl carbonate, ethylene glycol sulfite, 3-methyl-2-oxazolidone, triethylene glycol monomethyl ether, N-methylpyrrolidone, 1,2-dimethoxyethane, dimethylacetamide, ethylene glycol diacetate, or the like, which is merely one example of the aforementioned compound, but the present invention is not limited thereto.

The lithium salt may be used without any particular limitation as long as the lithium salt is a compound that may provide lithium ions used in the lithium-sulfur battery. $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, LiCl, LiI, $LiB(C_2O_4)_2$, $LiN(C_2F_5SO_2)_2$ (BETI), $LiN(CF_3SO_2)2$ (LiTFSI), $LiN(C_aF_{2a+1}SO_2)(C_bF_{2b+1}SO_2)$ (where a and b are each independently in a range of 1 to 20), lithium poly[4,4'-(hexafluoroisopropylidene)diphenoxy]sulfonyl imide (LiPHFIPSI), and the like may be used as one non-limiting example of the lithium salt. Among these, a sulfonyl group-containing imide lithium compound such as LiTFSI, BETI, LiPHFIPSI, or the like may be more preferred. The lithium salt in the electrolyte may be included at a concentration of 0.6 to 2 M. Therefore, the concentration of the lithium salt may be preferred in terms of high conductivity and low electrolyte viscosity.

Because the lithium-sulfur battery according to one embodiment of the present invention may include a cathode including the porous inorganic insulator-sulfur composite, an anode, an electrolyte, and a separator, the lithium-sulfur battery may exhibit excellent stability and higher electrochemical performance. Specifically, the lithium-sulfur battery including the porous inorganic insulator-sulfur composite as the cathode has excellent characteristics, that is, has a volumetric capacity of 450 $mAh/cm^3$ or more, particularly a volumetric capacity of 480 $mAh/cm^3$ or more, and more particularly a volumetric capacity of 550 $mAh/cm^3$ or more. Furthermore, the lithium-sulfur battery may also have an areal capacity of 2.1 $mAh/cm^2$ or more, particularly an areal capacity of 2.9 $mAh/cm^2$ or more, and more particularly an areal capacity of 3.6 $mAh/cm^2$ or more, and may exhibit excellent cycle capability due to a small decrease in specific capacity even after a number of cycles.

Also, another aspect of the present invention provides a lithium-sulfur battery including an interlayer.

The lithium-sulfur battery according to the present invention includes a cathode, an anode, an electrolyte, and a separator, and includes an interlayer interposed between the cathode and the separator. In this case, specific materials and contents of the anode and the electrolyte are similar or equivalent to the specific materials and contents of the anode and the electrolyte in the lithium-sulfur battery including the porous inorganic insulator-sulfur composite as the aforementioned cathode, respectively.

Here, the expression "interlayer interposed between a cathode and separator" means that an interlayer comes into contact with an upper surface of a cathode, that an interlayer comes into contact with one surface of a separator, or that an interlayer is present in a separate form. In this case, the interlayer according to the present invention may include all three cases.

As one example, the cathode included in the lithium-sulfur battery including the interlayer according to the present invention may be a cathode including the carbon-based conductor. In this case, the cathode may include sulfur as an active material. As one specific example, the cathode may be obtained by mixing a carbon-based conductor, sulfur, and a binder in a solvent to prepare slurry and drying the slurry. As one more specific example, the cathode may be a composite including a carbon-based conductor, sulfur, and a binder, which is coupled onto the current collector by coating the current collector with the slurry and drying the current collector. As still another example, a cathode composite layer including the porous inorganic insulator-sulfur composite may be used as the cathode, or a cathode composite layer including the porous inorganic insulator-sulfur composite coupled onto the current collector may be used as the cathode. The cathode composite layer may be the aforementioned cathode composite layer, and refers to a cathode composite layer in which a carbon-based conductor, a porous inorganic insulator-sulfur composite, and a binder are physically mixed and complexed.

In the lithium-sulfur battery including the interlayer according to the present invention, the interlayer may include the porous inorganic insulator, the porous inorganic insulator-sulfur composite, or a mixture thereof. In this case, the porous inorganic insulator-sulfur composite or the mixture thereof is generally referred to as particles. The interlayer is material that may be mixed with the interlayer particles, and may optionally further include a carbon-based conductor and a binder. In this case, the specific materials and contents of the sulfur, the carbon-based conductor, and the binder are similar or equivalent to the specific materials and contents of the sulfur, the carbon-based conductor, and the binder in the lithium-sulfur battery including the porous inorganic insulator-sulfur composite as the aforementioned cathode, respectively.

The lithium-sulfur battery according to one embodiment of the present invention includes a separator between the cathode and the anode, and the interlayer may be interposed between the cathode and the separator. More particularly, the interlayer may be present as a coating layer with which one surface of the cathode is coated, a coating layer with which one surface of the separator is coated, or a separate layer interposed between the cathode and the separator.

In this case, the expression "interlayer separately present between a cathode and a separator" means that a solid interlayer is not coupled to a cathode or a separator, but is present in the form of a separate film interposed between the cathode and the separator.

In a preferred aspect, in the lithium-sulfur battery according to one embodiment of the present invention, the interlayer included in the lithium-sulfur battery may be a free-standing interlayer. Specifically, when the interlayer is present as the coating layer in which one surface of the cathode is coated, or the coating layer in which one surface of the separator is coated, the lithium-sulfur battery has a drawback in that interactivity with polysulfide may be degraded and a range of applications may get narrower due to the low flexibility, compared to the interlayer present as the free-standing interlayer. In this case, the lithium-sulfur battery of the present invention may further include interlayer particles as the free-standing interlayer, and thus may have high interactivity with the polysulfide and high flexibility. Therefore, the lithium-sulfur battery including the interlayer particles as the free-standing interlayer may effectively inhibit the polysulfide from being diffused and adsorbed into a lithium electrode (an anode), and thus may have remarkably improved long-term stability and capacity and allow the design of a flexible lithium-sulfur battery. Therefore, the lithium-sulfur battery of the present invention may be advantageous because the lithium-sulfur battery has a wide range of applications.

The lithium-sulfur battery according to one favorable embodiment of the present invention includes a cathode, an anode, an electrolyte, and an interlayer, and the interlayer includes a porous inorganic insulator-sulfur composite, which includes a porous inorganic insulator; and sulfur supported in pores of the porous inorganic insulator.

In this case, the interlayer including the porous inorganic insulator-sulfur composite may be an interlayer including a composite in which a carbon-based conductor, a porous inorganic insulator-sulfur composite, and a binder are physically mixed and complexed. As one specific example, the interlayer may be prepared using a method, which includes mixing a carbon-based conductor, a porous inorganic insulator-sulfur composite, and a binder in a solvent to prepare slurry and casting the slurry into a mold; pressing the cast film to form a thin film; and drying the thin film under vacuum. In this case, the weight ratio of the porous inorganic insulator-sulfur composite and the carbon-based conductor may be in a range of 5:1 to 1:1, preferably in a range of 4:1 to 3:1.

The lithium-sulfur battery according to one embodiment of the present invention may include the porous inorganic insulator-sulfur composite as the interlayer, and thus is advantageous because the lithium-sulfur battery may further have remarkably improved long-term stability and durability. Specifically, the sulfur included in the interlayer including the porous inorganic insulator-sulfur composite is dissolved in an electrolyte to move toward a cathode including the carbon-based conductor, and participates in an electrochemical reaction on a surface of the carbon-based conductor present in the cathode. Meanwhile, insoluble lithium sulfide particles react with a polysulfide having high solubility and a long chain length to form polysulfide ions having a medium chain length, and the ions are allowed to move toward the cathode, and participate in an electrochemical reaction on a surface of the carbon-based conductor present in the cathode. In a conventional lithium-sulfur battery, an active material is present only in the cathode. However, the interlayer according to the present invention includes a high concentration of sulfur in pores of the porous inorganic insulator. In this case, the sulfur participates in an electrochemical reaction to increase a battery capacity and an energy density per unit volume and area. Furthermore, the interlayer may serve as a diffusion barrier that prevents a polysulfide from being dissolved and diffused to an anode after the sulfur included as the active material in the cathode is reduced. Also, the loss of the active material may be prevented by blocking an irreversible reaction of lithium with the polysulfide on a surface of the anode, resulting in remarkably improved long-term stability and durability. Specifically, the lithium-sulfur battery including the porous inorganic insulator-sulfur composite as the interlayer has flexibility, and thus may design a flexible lithium-sulfur battery. In this case, the lithium-sulfur battery may have an areal capacity of 3.5 mAh/cm$^2$ or more, particularly 4.5 mAh/cm$^2$ or more, and more particularly 5.4 mAh/cm$^2$ or more, and may exhibit excellent cycle capability due to a small decrease in specific capacity even after a number of cycles.

The lithium-sulfur battery according to the present invention has significance in that, when the porous inorganic insulator is used as a host material for sulfur, the sulfur may be used as a material for the cathode, the interlayer, or both of the cathode and the interlayer even though the porous inorganic insulator is not conductive. Particularly, because a high concentration of sulfur is supported in the cathode, the interlayer, or both the cathode and the interlayer, the capacity of sulfur may be highly increased per energy density and unit area.

Further, because the porous inorganic insulator included in the lithium-sulfur battery according to the present invention has a potent interaction with sulfur, the lithium-sulfur battery including the porous inorganic insulator-sulfur composite may minimize the loss of sulfur even when the lithium-sulfur battery is repeatedly charged and discharged, and may have high lifetime characteristics, high sulfur utilization, volumetric capacity, and areal capacity. Therefore, the lithium-sulfur battery according to the present invention may exhibit excellent cycle stability and rate capability, and thus may have very excellent applicability to medium and large energy storage devices, and may be particularly widely used in the industry fields requiring low-cost, high-capacity batteries, such as drones, electric vehicles, renewable energy storage devices, military affairs, and the like.

Hereinafter, the present invention will be described in further detail with reference to examples and comparative examples and the accompanying drawings.

Preparation Example 1: Preparation of Porous Silica

To prepare mesoporous silica in a porous inorganic insulator, 80 g of a hydrochloric acid solution (HCl) (2.0 M concentration) in which 0.32 g of ZrOCl$_2$ was dissolved was prepared, and 2.0 g of Pluronic P123 (Sigma-Aldrich, weight average molecular weight: 5,800 g/mol) was added to the hydrochloric acid solution to prepare a solution. The solution was stirred at 35° C. for 24 hours, and 4.5 mL of tetraethyl orthosilicate (TEOS, Aldrich, 98%) was then added to prepare a reaction solution. Thereafter, the reaction solution was stirred at the same temperature for another one hour.

The prepared reaction solution was stored in a Teflon container, and kept at 90° C. for 24 hours in an oven to perform a reaction. After the reaction was terminated, the resulting solid precipitate was separated through a filter, and washed several times with distilled water. The resulting white precipitate was dried at 60° C., and then calcined at a temperature of 550° C. for 5 hours under an air atmosphere to remove the remaining P123 and other organic substances. Finally, a crystal structure and a microstructure of the resulting mesoporous silica were confirmed using a powder X-ray diffraction (XRD) assay, a scanning electron microscope, and a transmission electron microscope.

Preparation Example 2: Preparation of Porous Titania

To prepare porous titania in a porous inorganic insulator, a powder, in which Mg (Sigma-Aldrich) and porous titania ($TiO_2$) (Sigma-Aldrich) whose weights satisfied, respectively, those as listed in Table 1 were mixed, was prepared, and the mixed powder was heat-treated at a relatively low temperature (650° C.) under a reducing atmosphere ($H_2$/Ar), and a 2 M HCl solution was subjected to an etching process for 12 hours to remove MgO newly formed in the heat-treated powder, and thus to prepare porous titania in which pores were formed in positions from which MgO was removed. In this case, a mixing molar ratio of Mg and $TiO_2$ and a reduction time were adjusted to adjust the size of pores. The detailed conditions are listed in Table 1 below. Finally, a crystal structure and a microstructure of the resulting porous titania were confirmed using a powder X-ray diffraction (XRD) assay, a scanning electron microscope.

TABLE 1

| Classification | $TiO_2$ weight (g) | Mg weight (g) | $TiO_2$:Mg molar ratio | Reduction time (h) |
|---|---|---|---|---|
| $TiO_{2-x}$ | 4 | 0.37 | 1:0.3 | 5 |
| TiO-5 h | 4 | 1.22 | 1:1 | 5 |
| TiO-8 h | 4 | 1.22 | 1:1 | 8 |

Preparation Example 3: Preparation of Porous Carbon

To prepare mesoporous carbon, the mesoporous carbon was synthesized using mesoporous silica as a template and a phenol/paraformaldehyde resin as a carbon precursor. 1 g of mesoporous silica and 0.35 g of phenol were mixed, and reacted at 100° C. for 12 hours under a vacuum atmosphere. Thereafter, the generated phenol-mesoporous silica mixture was reacted with 0.3 g of paraformaldehyde at 160° C. for 8 hours under a vacuum atmosphere to prepare a phenol/paraformaldehyde resin-mesoporous silica composite.

The prepared phenol/paraformaldehyde resin-mesoporous silica composite was carbonized by heat treatment at 900° C. for 6 hours under an argon atmosphere. The carbonized composite was dissolved in a mixed solvent (distilled water:hydrogen fluoride volumetric ratio=1:1), kept at room temperature for 12 hours, and then repeatedly washed with distilled water to remove the mesoporous silica. Finally, the composite was dried at 80° C. to obtain mesoporous carbon.

Experimental Example 1: Analysis of Electrochemical Characteristics

To analyze characteristics of lithium-sulfur batteries, analysis of the electrochemical characteristics of the batteries in the form of CR2032 lithium-sulfur batteries were carried out using cyclic voltammetry (CV) and a galvanostatic charge/discharge experiments The CV experiment was performed at scan rate of 0.1 mV/s in a voltage range of 1.8 to 2.7 V using an electrochemical experiment station (Bio-logic VSP-1). Evaluation of the charge/discharge characteristics was carried out at a low current density of 0.1 C (1 C=1,675 mA/g) for initial 2 cycles using a BaSyTech multi-channel battery test system. Thereafter, an additional experiment was performed at another C rate. All the electrochemical experiments were performed at 25±2° C.

Experimental Example 2: Analysis of Surface and Crystal Characteristics

Surface and inner structures were observed at an accelerating voltage of 10 kV using a scanning electron microscope (SEM, Hitachi S-4700), and an image obtained using a transmission electron microscope (TEM, EM 912 Omega) was observed at a condition of voltage of 120 kV.

A crystal structure was analyzed using a powder X-ray diffraction assay (a Rigaku Smartlab diffractometer), and a 2 θ value was measured in a range of 0.6 to 5.0° using small-angle X-ray diffraction (small angle XRD; SAXS, Empyrean diffractometer system) to analyze the characteristics of the mesoporous structure. The crystal spectra were measured under conditions of a voltage of 40 kV and a current of 40 mA using Cu Kα (λ=1.5406 Å).

Experimental Example 3: Analysis of Pore Structure and Thermal Characteristics A quantity of supported sulfur was measured by means of thermogravimetric analysis (TGA, Bruker TG-DTA 2000SA), and the TGA was performed at a heating rate of 10° C./min in a range from room temperature to 600° C. under an atmospheric condition.

The nitrogen adsorption-desorption isotherms were measured at −196° C. using a surface area/porosity measuring device (Micromeritics ASAP 2020), and the specific surface area was measured based on the results of nitrogen adsorption at a relative pressure of 0.05 to 0.2 using a Brunauer-Emmett-Teller (BET) method. The whole pore volume was determined by measuring a quantity of adsorbed nitrogen at a relative pressure of 0.99, and the pore size distribution was determined from adsorption branches having isothermal characteristics using a Barrett-Joyner-Halenda (BJH) method.

Example 1: Preparation of Porous Silica-Sulfur Composite

To prepare a porous silica-sulfur composite using the mesoporous silica obtained in Preparation Example 1, a 2-step melting-diffusion method was used. The whole preparation method is shown in FIG. 1. Specifically, to satisfy the contents listed in Table 2, platelet-ordered mesoporous silica (pOMS) and pure sulfur were pulverized and mixed, and the resulting mixture was heated at a temperature of 155° C. for 20 hours in a closed container to melt sulfur. Thereafter, the melted sulfur was allowed to diffuse into pores of the mesoporous silica. Then, a glass vial was filled with the material calcined by the heat treatment, and an opening of the filled glass vial was connected to an opening of another empty glass vial, and then sealed with a Teflon tape. The sealed glass vial was heated at a temperature of 250° C. for 3 hours under a nitrogen atmosphere to allow sulfur to further diffuse into the mesoporous silica. When the heating step was completed, the glass vial was cooled to finally obtain a mesoporous silica-sulfur composite.

TABLE 2

| Classification | Mesoporous silica content (g) | Sulfur content (g) |
| --- | --- | --- |
| pOMS/S80 | 0.2 | 0.8 |
| pOMS/S70 | 0.3 | 0.7 |
| pOMS/S50 | 0.5 | 0.5 |
| pOMS/S30 | 0.7 | 0.3 |

Example 2: Preparation of Lithium-Sulfur Battery Including Porous Silica-Sulfur Composite as Cathode A CR2032 (Hohsen Corporation, Japan)-typed lithium-sulfur battery (electrode area: 2 cm$^2$) was prepared in a glove box under an argon atmosphere. Specifically, the mesoporous silica-sulfur composite prepared in Example 1, particularly pOMS/S80, was used as a main material of a cathode, lithium foil (99.9% purity, 150 μm thickness) was used as an anode, and Celgard 2400 was used as a separator.

To prepare a cathode, 60% by weight of pure sulfur, 20% by weight of ketjen black as a conductor, and 20% by weight of polyethyleneoxide (weight average molecular weight: 1,000,000 g/mol) as a polymer binder were mixed in pOMS/S80, dissolved in a small quantity of an acetonitrile solvent, and then violently mixed at 35° C. for 3 hours. The resulting slurry was cast into an aluminum foil current collector coated with carbon, and dried. The slurries to be cast were cast at different quantities such that the solid contents of sulfur were 2 mg/cm$^2$, 3 mg/cm$^2$, 4 mg/cm$^2$, and 6.5 mg/cm$^2$, respectively, during the casting of the slurry, and dried to prepare four different types of cathodes.

An electrolyte solution was dissolved in a co-solvent of 1,3-dioxolane and 1,2-dimethoxyethane in which lithium bis(trifluoromethanesulfonyl) imide (LiTFSI) and lithium nitrate (LiNO$_3$) were mixed at a volumetric ratio of 1:1 so that the concentrations of the LiTFSI and LiNO$_3$ were 1.0 M and 0.1 M, respectively. A lithium-sulfur battery having a sulfur content of 2 mg/cm$^2$ was completed by assembly after injection of 60 μL of an electrolyte. When the content of sulfur increased to 3 mg/cm$^2$, 4 mg/cm$^2$, and 6.5 mg/cm$^2$, a quantity of the electrolyte was also injected at an increasing content of 90 μL, 120 μL, and 195 μL. In this case, the quantities of the electrolyte and sulfur were set so that the electrolyte and sulfur were maintained at a ratio of 15:1 (μL:mg).

Example 3: Preparation of Lithium-Sulfur Battery Including Porous Silica-Sulfur Composite Layer To prepare a lithium-sulfur battery further including an interlayer between a cathode and a separator, a lithium-sulfur battery including a mesoporous silica-sulfur composite as the interlayer was prepared. In this case, the lithium-sulfur battery was prepared in the same manner as in Example 2, except that, when the lithium-sulfur battery was assembled during the preparation of Example 2, the lithium-sulfur battery was processed to include the interlayer between the cathode and the separator, and then assembled. Specifically, a sulfur cathode not including a porous inorganic insulator host (a sulfur cathode in which a quantity of supported sulfur was 2.5 mg/cm$^2$ in Comparative Example 1) was used as the cathode, the mesoporous silica-sulfur composite (pOMS/S30, pOMS/S50 and pOMS/S70) prepared in Example 1 was used as the interlayer, lithium foil was used as the anode, and Celgard 2400 was used as the separator.

In this case, the interlayer was prepared using the following process. 80% by weight of a mesoporous silica-sulfur composite (silica:sulfur weigh ratios of 56:24, 40:40, and 24:56 in the case of pOMS/530, pOMS/50, and pOMS/570, respectively), 10% by weight of ketjen black, and 10% by weight of polytetrafluoroethylene were dissolved in a mixed solvent (distilled water:isopropanol volumetric ratio=3:7), and then violently mixed at 35° C. for 3 hours to prepare a free-standing interlayer slurry. Thereafter, the prepared slurry was cast onto aluminum foil, and the cast film was pressed to form a thin film. Then, the thin film was dried under vacuum, and the aluminum foil was then removed to complete an interlayer including the mesoporous silica-sulfur composite layer. In this case, the quantities of the slurries to be cast were adjusted during the casting of the slurry so that the quantities of sulfur supported in the interlayer were 2.0 mg/cm$^2$, 5.0 mg/cm$^2$, and 7.5 mg/cm$^2$, respectively, thereby preparing three different types of interlayers including the mesoporous silica-sulfur composite layer.

Lithium-sulfur batteries including the three different types of mesoporous silica-sulfur composite interlayers thus prepared were named pOMS/S30 IL (a total quantity of supported sulfur: 4.5 mg/cm$^2$), pOMS/S50 IL (a total quantity of supported sulfur: 7.5 mg/cm$^2$), and pOMS/S70 IL (a total quantity of supported sulfur: 10 mg/cm$^2$).

Example 4: Preparation of Lithium-Sulfur Battery Including Porous Silica Layer

A lithium-sulfur battery (hereinafter referred to as "pOMS IL") of Example 4 was prepared in the same manner as in Example 3, except that, as the main material of the interlayer, mesoporous silica (pOMS) was used instead of the mesoporous silica-sulfur composite used in Example 3.

Example 5: Preparation of Porous Titania-Sulfur Composite

To prepare a porous titania-sulfur composite using commercially available porous titania (TiO$_2$) (Sigma-Aldrich) and the porous titania obtained in Preparation Example 2, the same 2-step melting-diffusion method as in Example 1 was used. Specifically, to satisfy the contents listed in Table 3, 0.3 g of porous titania and 0.7 g of pure sulfur were pulverized and mixed, and the resulting mixture was heated at a temperature of 155° C. for 20 hours in a closed container to melt sulfur. Thereafter, the melted sulfur was allowed to diffuse into pores of the porous titania. Then, a glass vial was filled with the material calcined by the heat treatment, and an opening of the filled glass vial was connected to an opening of another empty glass vial, and then sealed with a Teflon tape. The sealed glass vial was heated at a temperature of 250° C. for 3 hours under a nitrogen atmosphere to allow sulfur to further diffuse into the porous titania. When the heating step was completed, the glass vial was cooled to finally obtain a porous titania-sulfur composite.

TABLE 3

| Classification | Porous titania content (g) | Sulfur content (g) |
|---|---|---|
| TiO$_2$-S70 | 0.3 | 0.7 |
| TiO2-x-S70 | 0.3 | 0.7 |
| TiO-5 h-S70 | 0.3 | 0.7 |
| TiO-8 h-S70 | 0.3 | 0.7 |

Example 6: Preparation of Lithium-Sulfur Battery Including Porous Titania-Sulfur Composite as Cathode A lithium-sulfur battery of Example 6 was prepared in the same manner as in Example 2, except that, as the main material of the cathode, the porous titania-sulfur composite prepared in Example 5 was used instead of the mesoporous silica-sulfur composite used in Example 2. Specifically, a porous titania-sulfur composite was used as the cathode, lithium foil (99.9% purity, 150 μm thickness) was used as the anode, and Celgard 2400 was used as the separator.

In this case, to prepare a cathode, sulfur, a binder (polyethyleneoxide, weight average molecular weight: 1,000,000 g/mol), and a conductor (ketjen black) were mixed to satisfy a weight ratio of 7:1.5:1, based on the content of sulfur included in the porous titania. Thereafter, the resulting mixture was dissolved in a small quantity of an acetonitrile solvent, and violently mixed at 35° C. for 3 hours. The resulting slurry was cast into an aluminum foil current collector coated with carbon, and dried. The slurry to be cast was cast at a quantity such that the solid content of sulfur was 1.5 mg/cm$^2$ during the casting of the slurry, and dried to prepare a cathode.

An electrolyte solution was dissolved in a co-solvent of 1,3-dioxolane and 1,2-dimethoxyethane in which lithium bis(trifluoromethanesulfonyl) imide (LiTFSI) and lithium nitrate (LiNO$_3$) were mixed at a volumetric ratio of 1:1 so that the concentrations of the LiTFSI and LiNO$_3$ were 1.0 M and 0.1 M, respectively. A lithium-sulfur battery was completed by assembly after injection of 45 μL of an electrolyte. In this case, the quantities of the electrolyte and sulfur were set so that the electrolyte and sulfur were maintained at a ratio of 15:1 (μL:mg).

Comparative Example 1: Preparation of Lithium-Sulfur Battery Including Cathode

To prepare a lithium-sulfur battery including pure sulfur as a cathode, a sulfur cathode was first prepared. For predation of the sulfur cathode, 60 or 70% by weight of pure sulfur, 20% by weight of ketjen black, and 20 or 10% by weight of polyethyleneoxide were dissolved in a small quantity of an acetonitrile solvent, and then violently mixed at 35° C. for 3 hours to prepare cathode slurry. Thereafter, the prepared cathode slurry was cast into an aluminum foil current collector coated with carbon, and dried. In this case, a quantity of the slurry used for casting was adjusted so that the quantities of sulfur supported in the cathode were 2.0 mg/cm$^2$ (used for comparison of Example 2, a pure sulfur: ketjen black:polyethyleneoxide weight ratio of 60:20:20) and 2.5 mg/cm$^2$ (used in the cathodes of Examples 3 and 4 and Comparative Example 2, a pure sulfur:ketjen black: polyethyleneoxide weight ratio of 70:20:10), thereby preparing two different types of sulfur cathodes. Next, to prepare a lithium-sulfur battery including the prepared sulfur cathode, a lithium-sulfur battery of Comparative Example 1 was assembled using the same method as in Example 2, except that the prepared sulfur cathode was used instead of the porous silica-sulfur composite cathode used in Example 2.

Comparative Example 2: Preparation of Lithium-Sulfur Battery Including Porous Carbon Layer A lithium-sulfur battery (hereinafter referred to as "pOMC IL") of Comparative Example 2 was prepared in the same manner as in Example 3, except that, as the main material of the interlayer, the mesoporous carbon (pOMC) prepared in Preparation Example 3 was used instead of the mesoporous silica-sulfur composite used in Example 3.

Figure 3A:
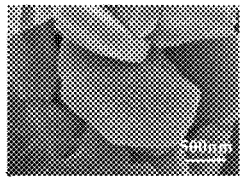
FIGS. 3A and 3B show images of mesoporous silica observed using a scanning electron microscope (SEM)
Figure 3B:
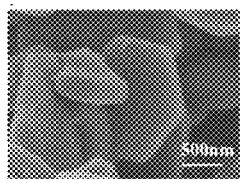
Figure 3C:
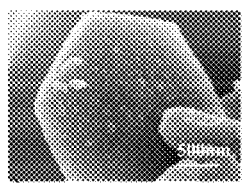
FIGS. 3C, 3D, and 3E show images of a mesoporous silica-sulfur composite observed using the scanning electron microscope.
Figure 3D:
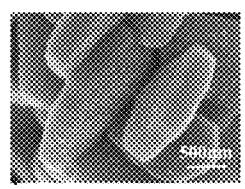
Figure 3E:
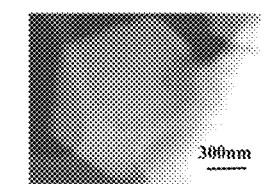

FIGS. 3A and 3B show images of a surface of the mesoporous silica prepared in Preparation Example 2, as observed using a scanning electron microscope (SEM). It can be seen that the mesoporous silica had a thin disk-shaped structure with a hexagonal array, had a thickness distribution of 250 nm to 350 nm, and had a length of 600 nm to 1,000 nm along one edge of a hexagonal prism. In particular, because the mesoporous silica had mesopore channels in an out-of plane direction with respect to a plane, the mesoporous silica had a short diffusion length for supporting sulfur, thereby enabling the mesoporous silica to support sulfur quickly and easily. FIGS. 3C and 3D show images of a surface of the mesoporous silica-sulfur composite prepared in Example 1, as observed using the scanning electron microscope. It can be seen that the surface of the composite in which sulfur was supported was coated with sulfur to further increase surface roughness, indicating that the shape of the mesoporous silica was maintained constant even when the sulfur was supported in the mesoporous silica.

Figure 3F:
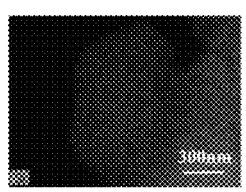
FIGS. 3F, 3G, and 3H show images of a silicon element, an oxygen element, and a sulfur element observed using an energy dispersive spectrometer (SEM-EDS), respectively.
Figure 3G:
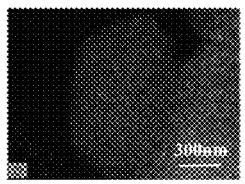
Figure 3H:
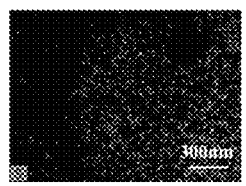

FIGS. 3F, 3G and 3H show images of distributions of a silicon element, an oxygen element, and a sulfur element for the mesoporous silica-sulfur composite prepared in Example 1, respectively, as observed using an energy dispersive spectrometer (SEM-EDS). It was revealed that the sulfur was uniformly supported in the mesoporous silica, and the silicon and oxygen elements corresponding to the wall material of the mesoporous silica were also uniformly distributed and also had almost the same distribution intensity, and thus the silica wall material having excellent quality without any impurities was prepared.

Figure 4A:
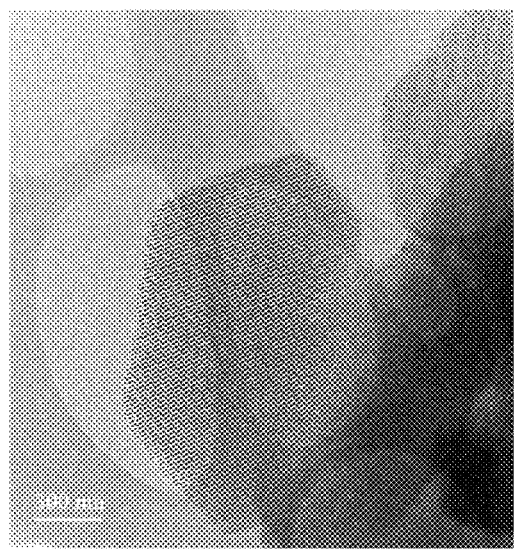
FIGS. 4A and 4B show images of a surface the mesoporous silica observed using a transmission electron microscope (TEM).
Figure 4B:
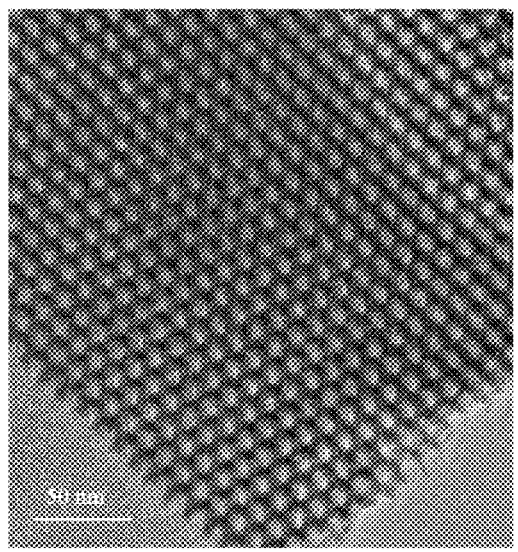

FIG. 4 shows an image of a surface the mesoporous silica prepared in Preparation Example 1, as observed using a transmission electron microscope (TEM). It can be seen that a thin disk-shaped structure with a hexagonal array was confirmed and the mesopores were uniformly formed, like the results of the scanning electron microscope.

Figure 5A:
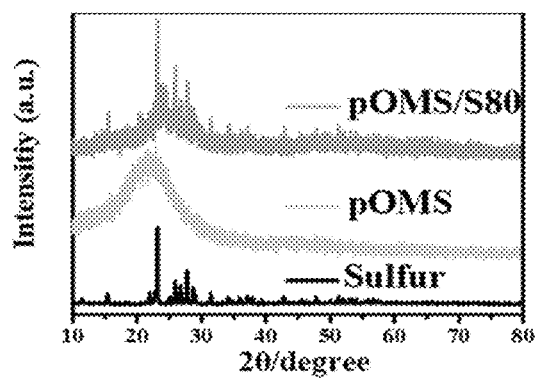
FIG. 5A is a diagram showing X-ray diffraction (XRD) patterns of sulfur, the mesoporous silica, and the mesoporous silica-sulfur composite.

FIG. 5A is a diagram showing X-ray diffraction (XRD) patterns of the sulfur, the mesoporous silica, and the mesoporous silica-sulfur composite. It can be seen that the mesoporous silica prepared in Preparation Example 1 had a wide range of peaks for amorphous silica at a 2 θ angle of approximately 22°, and a number of peaks derived from the sulfur crystals was observed in an angle range of 20° to 30°. Also, it was revealed that, because a number of peaks derived from the sulfur crystals were observed to be intact in the case of the mesoporous silica-sulfur composite prepared in Example 1, a high content of sulfur was supported in the mesopores of the mesoporous silica, and the sulfur was well preserved in the form of crystals.

Figure 5B:
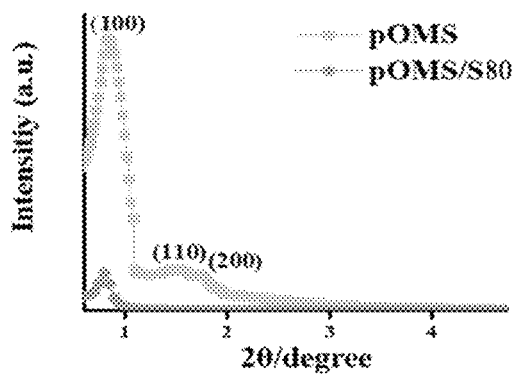
FIG. 5B is a diagram showing small-angle X-ray diffraction (small angle XRD; SAXS) patterns of the mesoporous silica and the mesoporous silica-sulfur composite.

FIG. 5B is a diagram showing small-angle X-ray diffraction (small angle XRD; SAXS) patterns of the mesoporous silica and the mesoporous silica-sulfur composite. The mesoporous silica prepared in Preparation Example 1 exhibited a high-intensity diffraction pattern on a (100) plane, and exhibited a somewhat weak-intensity diffraction pattern on (110) and (200) planes, strongly suggesting that the mesoporous silica has a pore structure of 2D hexagonal p6 mm. It can be seen that the diffraction pattern on the (100) plane significantly decreased in the case of the mesoporous silica-sulfur composite prepared in Example 1, and also that the diffraction pattern on the (110) and (200) planes almost disappeared. This indicates that, as a high content of sulfur was supported in the mesopores of the porous silica, most of the mesopores disappeared because the sulfur was supported in most of the mesopores.

Figure 6A:
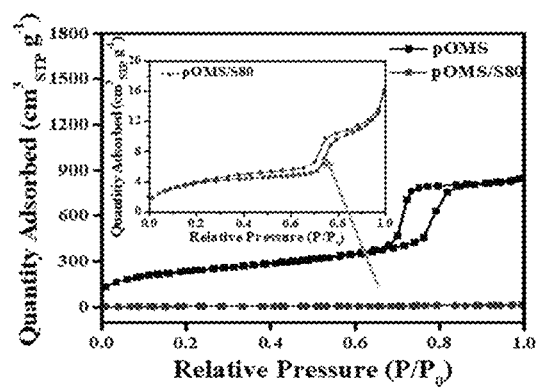
FIG. 6A is a diagram showing nitrogen adsorption-desorption isotherms of the mesoporous silica and the mesoporous silica-sulfur composite.
Figure 6B:
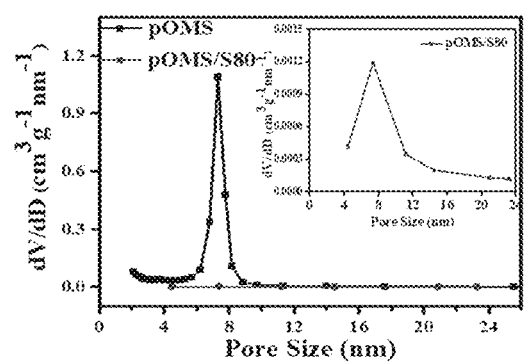
FIG. 6B is a diagram showing a mesopore distribution of the mesoporous silica and the mesoporous silica-sulfur composite.

FIG. 6A is a diagram showing a nitrogen adsorption-desorption isotherm measured for the mesoporous silica prepared in Preparation Example 1. It was revealed that the mesoporous silica was mesoporous silica whose meso-sized pore structure was well-developed, which was prepared to show an IV-typed isotherm having a large hysteresis loop. FIG. 6B is a diagram showing a mesopore distribution measured for the mesoporous silica. It was revealed that the mesoporous silica had an average pore size of 7.3 nm, had very uniform mesopores due to a narrow pore distribution, and had a specific surface area of 844 $m^2/g$. However, the mesoporous silica-sulfur composite prepared in Example 1 was measured to have a highly decreased specific surface area of 2.1 $m^2/g$, but is not shown in the drawings. It was revealed that the mesoporous silica has a total cumulative pore volume of 1.23 $cm^3/g$ but the mesoporous silica-sulfur composite had a total cumulative pore volume of 0.005 $m^3/g$. This indicates that most of the mesopores of the mesoporous silica disappeared because sulfur was supported in 99.6% of the pores of the mesoporous silica, which was consistent with the small-angle XRD results shown in FIG. 5. These results suggest that the 2-step melting-diffusion method according to the present invention is a method that is very effective in supporting sulfur in almost all the pores of the mesoporous silica.

Although not shown in the drawings, the thermogravimetric analysis results suggest that sulfur was completely decomposed in a temperature range of 150 to 330° C., but the mesoporous silica-sulfur composite prepared in Example 1 started to be decomposed at a temperature of 200° C. and the decomposition of the mesoporous silica-sulfur composite was terminated at a temperature of 350° C. This suggests that the mesoporous silica is a good host capable of stably supporting sulfur. Also, the content of sulfur was calculated based on the mass loss. As a result, it was revealed that the sulfur content of the mesoporous silica-sulfur composite prepared in Example 1 was shown to be 79.7% by weight, and thus the contents of the mesoporous silica and sulfur had a weight ratio of approximately 1:4, indicating that the energy density in the lithium-sulfur battery may be significantly improved because a high content of sulfur is supported in the mesoporous silica-sulfur composite.

Figure 7:
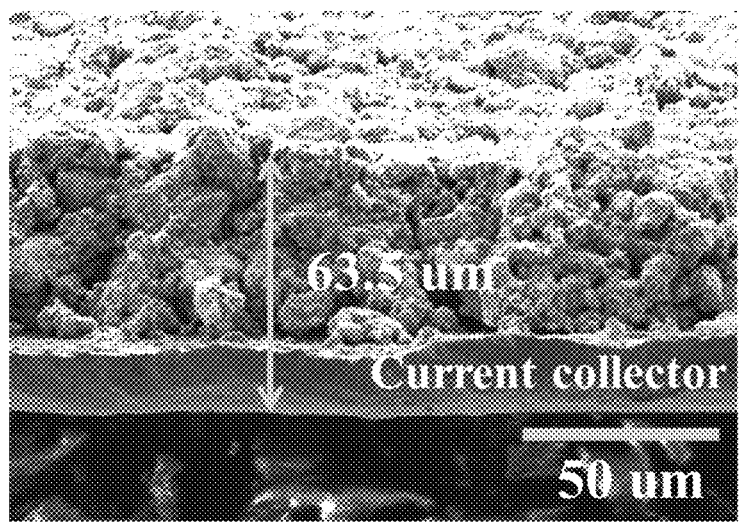
FIG. 7 is a diagram showing an image of a cathode in which a cathode composite layer is coupled onto a current collector, as observed using the scanning electron microscope.
Figure 8A:
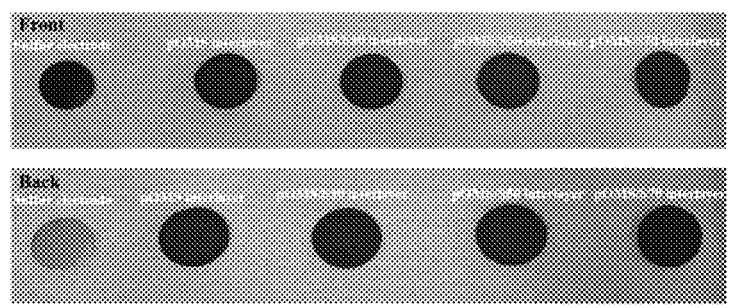
FIGS. 8A-8G are diagrams showing a digital image of a lithium-sulfur battery including an interlayer prepared in Example 3, and an image of the lithium-sulfur battery including an interlayer prepared in Example 3 observed using the scanning electron microscope.
Figure 8B:
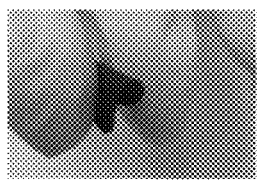
Figure 8C:
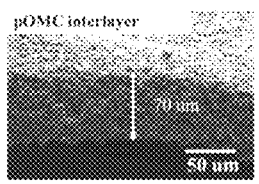
Figure 8D:
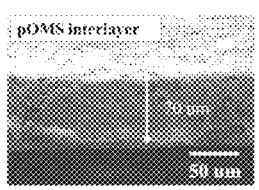
Figure 8E:
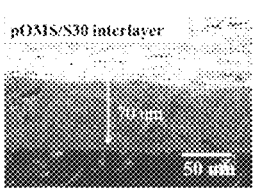
Figure 8F:
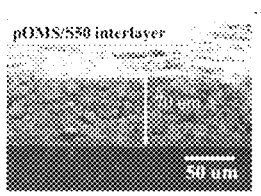
Figure 8G:
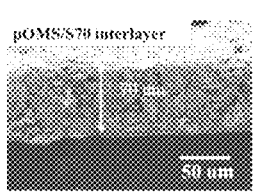

FIG. 7 is a diagram showing an image of a cathode in which a cathode composite layer is coupled onto a current collector as observed using the scanning electron microscope. It was revealed that the total quantity of sulfur in the cathode composite layer was 4 mg/cm², the thickness of the current collector was 20 μm, and the thickness of the cathode composite layer was 43.5 μm. The following Table 4 lists the thicknesses of the cathode composite layers and the thicknesses of the cathodes with respect to the total quantity of sulfur in the cathode composite layer. As can be seen in Table 4 below and the electrochemical characteristics as will be described below, it was revealed that, when the cathode composite layer includes the mesoporous silica-sulfur composite as the cathode material, the thinner thickness of the cathode may be realized compared to that of the mesoporous carbon body, and the cathode composite layer may have excellent characteristics in terms of high volume capacity in spite of the thin cathode thickness.

TABLE 4

| Sulfur solid content (Sulfur loading) (mg/cm²) | Thickness of cathode composite layer (thickness of cathode only) (μm) | Total thickness of cathode (μm) |
| --- | --- | --- |
| 2 | 22.5 | 44.5 |
| 3 | 36.5 | 56.5 |
| 4 | 43.5 | 63.5 |
| 6.5 | 63.4 | 83.4 |

FIG. 8 is a diagram showing a digital image of the lithium-sulfur battery of Example 3 and an image of the lithium-sulfur battery observed using the scanning electron microscope. As shown in FIGS. 8A and 8B, the prepared interlayer has a free-standing interlayer structure, and may have flexibility. Also, as shown in FIGS. 8C and 8G, the thickness of the interlayer was uniformly adjusted to a thickness of 70 μm in that the interlayer had flexibility, and simultaneously does not have an influence on the size and weight of the lithium-sulfur battery.

FIG. 9 shows the electrochemical characteristics of a lithium-sulfur battery including the mesoporous silica-sulfur composite prepared in Example 2. FIG. 9A shows a cyclic voltammetry (CV) curve for the first 10 cycles measured at a scan rate of 0.1 mV/s in a voltage range of 1.8 to 2.7 V. As shown, the oxidation-reduction results of the polysulfide showed that the two oxidation-reduction signals were observed at 2.35/2.42 and 1.99/2.32 V, respectively. Accordingly, it can be seen that such two reduction peaks at 2.32 and 1.99 V suggested that the sulfur ($S_8$) was converted into $Li_2S_x$ (x=4 to 8), and then converted into $Li_2S_x Li_2S_2 Li_2S$ by means of a subsequent reduction reaction, indicating that the two reduction peaks were consistent with two discharge plateaus starting from 2.4 and 2.1 V, as shown in FIG. 9C. Also, two oxidation peaks measured at 2.35 and 2.42 V suggested that $Li_2S$ was converted into a $Li_2S_x$ polysulfide, and further oxidized into sulfur by means of an oxidation reaction, indicating that the two oxidation peaks were consistent with two discharge plateaus starting from 2.2 and 2.4 V, as shown in FIG. 9C. Because the CV peak intensity slightly decreased for the first 10 cycles, it was suggested that the lithium polysulfide in which the mesoporous silica-sulfur composite prepared in Example 1 may be dissolved and diffused was sufficiently maintained at the periphery of the cathode, thereby maintaining electrochemical stability.

Figure 9A:
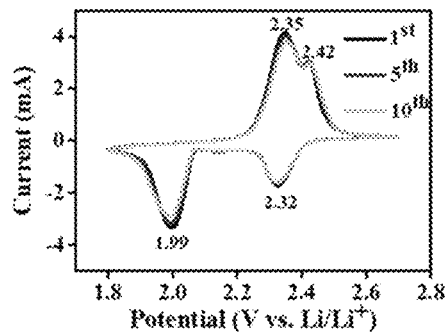
FIGS. 9A-9H are diagrams showing an electrochemical reaction of lithium-sulfur batteries prepared in Example 2 and Comparative Example 1 according to the charge/discharge cycle.
Figure 9B:
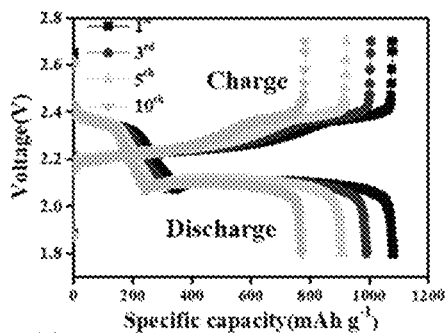
Figure 9C:
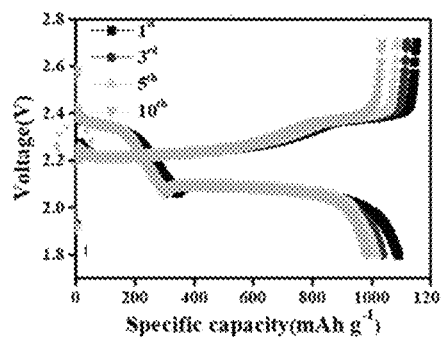

The prepared lithium-sulfur battery was subjected to charge/discharge cycles at a low initial current density of 0.1 C (1 C=1,675 mA/g) and stabilized, and then further subjected to charge/discharge cycles at a high current density. FIGS. 9B and 9C show galvanostatic charge/discharge curves obtained at a current density of 0.2 C from the lithium-sulfur batteries of Comparative Example 1 in which the sulfur was used as the cathode and Example 2 (a quantity of supported sulfur: 2 mg/cm$^2$) in which the porous silica-sulfur composite was used as the cathode. It can be seen that the lithium-sulfur batteries of Comparative Example 1 and Example 2 had an initial discharge capacity at 0.2 C of 1,080 mAh/g and 1,090 mAh/g, respectively, but had a discharge capacity of 771 mAh/g and 982 mAh/g, respectively, after the first 10 cycles at 0.2 C, indicating that the discharge capacities of the lithium-sulfur batteries decreased to 71% and 90%. This shows that the loss of sulfur may be effectively lowered to inhibit a decrease in discharge capacity when the mesoporous silica of Preparation Example 1 is used as the host material. Also, it can be seen that, when the galvanostatic charge/discharge results (FIG. 9C) of the lithium-sulfur battery of Example 2 were compared with the galvanostatic charge/discharge results (FIG. 18) of the lithium-sulfur battery including a porous titania-sulfur composite (a quantity of supported sulfur: 1.5 mg/cm$^2$) as the cathode prepared in Example 6, the lithium-sulfur battery of Example 2 had a superior capacity retention rate compared to the lithium-sulfur battery of Example 6 although the lithium-sulfur battery of Example 2 had a higher sulfur content than the lithium-sulfur battery of Example 6.

Figure 9D:
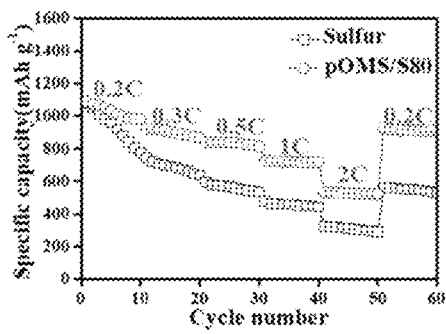
Figure 9E:
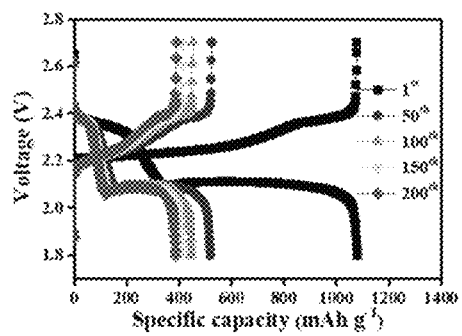

FIG. 9D is a diagram showing the rate capability. Each of the lithium-sulfur batteries of (a quantity of supported sulfur: 2 mg/cm$^2$) of Example 2 and Comparative Example 1 were changed/discharged for 10 cycles with a current density increasing from 0.2 C to 2 C and a current density decreasing to 0.2 C. The lithium-sulfur battery of Comparative Example 1 had an initial specific capacity of 1,080 mAh/g, but had a specific capacity at 0.3 C of 742 mAh/g, a specific capacity at 0.5 C of 595 mAh/g, a specific capacity at 1 C of 476 mAh/g, and a specific capacity at 2 C of 322 mAh/g, and had a specific capacity of 561 mAh/g when the current density was restored to 0.2 C, which was shown to be 52% with respect to the initial capacity. That is, it can be seen that the specific capacity of the lithium-sulfur battery of Comparative Example 1 drastically decreased due to the drastic loss of sulfur used in the cathode. However, the lithium-sulfur battery of Example 2 had a specific capacity at 0.2 C of 1,090 mAh/g, a specific capacity at 0.3 C of 922 mAh/g, a specific capacity at 0.5 C of 841 mAh/g, a specific capacity at 1 C of 724 mAh/g, and a specific capacity at 2 C of 532 mAh/g, and had a specific capacity of 920 mAh/g when the current density was restored to 0.2 C, which was shown to be 84% with respect to the initial capacity. These excellent rate capability results indicated that the mesoporous silica-sulfur composite of Example 2 drastically reduced the loss of sulfur, and also suggested that the porous silica served as a good reservoir for polysulfide because the porous silica had a pore structure having a high surface area, and also had a high degree of affinity for the polysulfide.

Figure 9F:
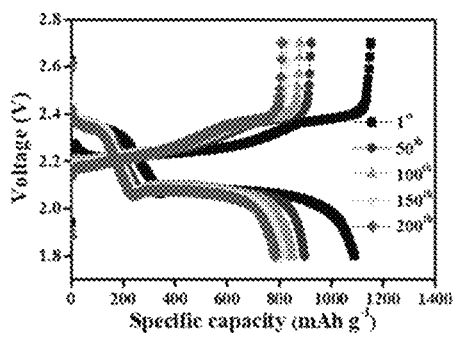

FIGS. 9E to 9H are diagrams showing the cycle capabilities under various conditions. After 200 cycles were completed, as shown in FIG. 9F, the lithium-sulfur battery of Example 2 had a capacity loss rate of 0.14% per cycle and a Coulombic efficiency of approximately 100%, and finally maintained a capacity of 72% with respect to the initial capacity. On the other hand, the lithium-sulfur battery (a sulfur cathode in which a quantity of supported sulfur was 2 mg/cm$^2$) of Comparative Example 1 had a capacity loss rate of 0.32% per cycle under the same condition as in FIG. 9E, and finally maintained a capacity of 36% with respect to the initial capacity.

Figure 9G:
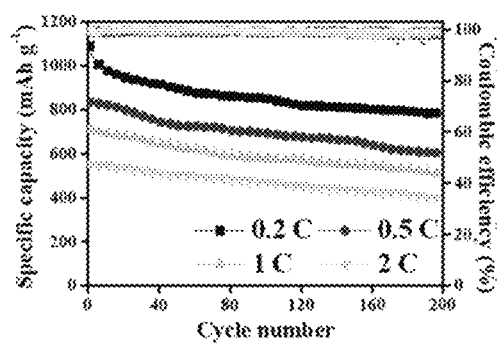
Figure 9H:
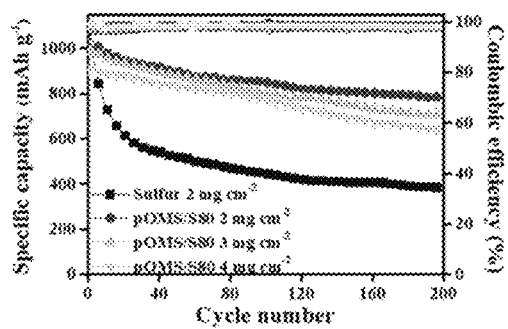
Figure 10A:
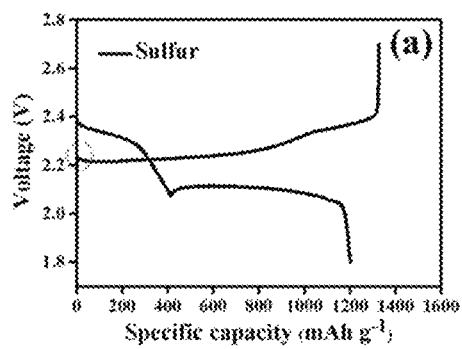
FIGS. 10A-10D are diagrams showing voltage profiles of lithium-sulfur batteries prepared in Example 2 and Comparative Example 1 and showing the direct current internal resistance (DC-IR) and charge power of the lithium-sulfur batteries using a hybrid pulse power characteristics (HPPC) method.
Figure 10B:
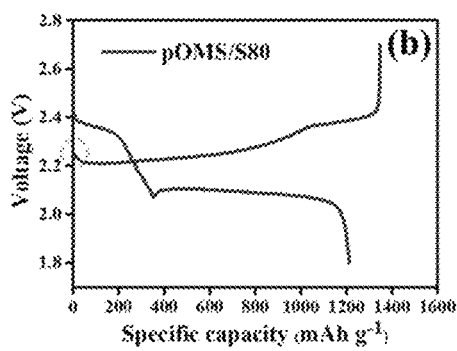
Figure 10C:
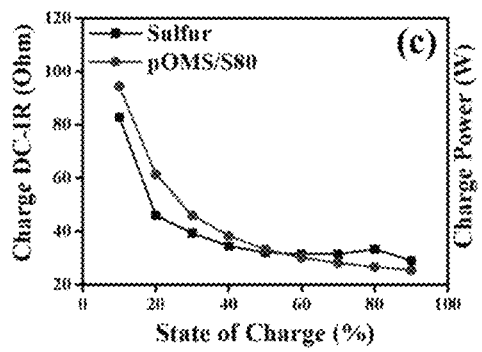
Figure 10D:
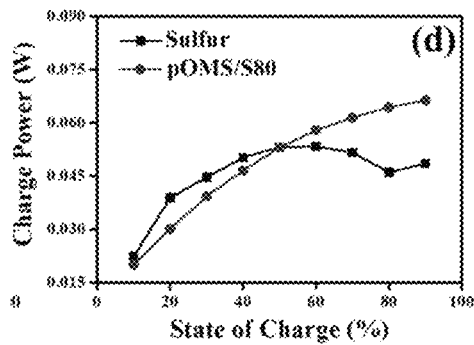

To test the long-term cycle stability, the lithium-sulfur battery of Example 2 in which a 2 mg/cm$^2$ content of sulfur was supported was tested at various current densities. As a result, as shown in FIG. 9G, the lithium-sulfur battery of Example 2 had an initial discharge capacity of 1,090, 837, 713, and 552 mAh/at 0.2, 0.5, 1, and 2 C, respectively, and maintained a capacity of approximately 72% in all samples after the 200 cycles, and had a capacity loss rate of 0.14% per cycle. Meanwhile, the lithium-sulfur batteries were prepared with an increasing quantity (2 mg/cm$^2$, 3 mg/cm$^2$, and 4 mg/cm$^2$) of supported sulfur. As a result, it was revealed that the lithium-sulfur batteries had an initial specific capacity of 1,090, 983 and 904 mAh/g, respectively, and the specific capacity rather decreased with an increasing quantity of sulfur. As shown in FIG. 9H, when the lithium-sulfur batteries were tested at 0.2 C for 200 cycles, the lithium-sulfur batteries had a capacity retention rate of 72%, 72%, and 71%, respectively, exhibited the same cycle capability regardless of the quantity of supported sulfur, and also had a Coulombic efficiency of approximately 100%. As described above, from the results as shown in FIG. 9, it can be seen that the lithium-sulfur battery of Example 2 exhibited excellent rate capability, and exhibited excellent cycle capability because the lithium-sulfur battery had a capacity retention rate of 70% or more after 200 cycles. Also, it can be seen that, although the porous silica was not conductive, the sulfur in the silica pores was actively oxidized/reduced to participate in the charge/discharge cycle.

FIG. 10 is a diagram showing voltage profiles of lithium-sulfur batteries of Comparative Example 1 in which sulfur is used as the cathode and Example 2 in which the mesoporous silica-sulfur composite is used as the cathode, and showing the direct current internal resistance (DC-IR) and charge power of the lithium-sulfur batteries using a hybrid pulse power characteristics (HPPC) method. The lithium-sulfur battery of Example 2 exhibited the relatively high DC-IR and relatively low charge power due to the non-conductive characteristics of silica, compared to the lithium-sulfur battery of Comparative Example 1. However, when the state of charge (SOC) was greater than or equal to 50%, a relative quantity of the soluble polysulfide to the insoluble lithium sulfide increased. Therefore, the DC-IR and charge power behaviors of the lithium-sulfur battery of Example 2 were reversed compared to the lithium-sulfur battery of Comparative Example 1. This phenomenon means that the mesoporous silica-sulfur composite is stabilized by a better interaction with the polysulfide, strongly suggesting that the lithium-sulfur battery may have low resistance and superior output characteristics when the mesoporous silica-sulfur composite is included in the lithium-sulfur battery.

FIG. 11 is a diagram showing areal capacity and volumetric capacity of the lithium-sulfur battery prepared in Example 2 according to the quantity of supported sulfur. In the drawings, the lithium-sulfur batteries were indicated by pOMS/S80 2 mg/cm$^2$, pOMS/S80 3 mg/cm$^2$, pOMS/S80 4 mg/cm$^2$, and pOMS/S80 6.5 mg/cm$^2$, respectively, according to the quantity of supported sulfur. As shown in FIGS. 11A and 11 C, it was revealed that the initial areal capacities of the pOMS/S80 2 mg/cm$^2$, the pOMS/S80 3 mg/cm$^2$, the pOMS/S80 4 mg/cm$^2$, and the pOMS/S80 6.5 mg/cm$^2$ were shown to be 2.18, 2.95, 3.63 and 5.30 mAh/cm$^2$, respectively, which increased in proportion to the quantity of supported sulfur in the lithium-sulfur batteries. Also, when the lithium-sulfur batteries were tested at 0.2 C for 200 cycles, the lithium-sulfur batteries had an areal capacity retention rate of 71% and 72%, respectively, and also exhibited high cycle stability. In the case of the volumetric capacity, as shown in FIGS. 11B and 11D, it was revealed that the initial volumetric capacities of the pOMS/S80 2 mg/cm$^2$, the pOMS/S80 3 mg/cm$^2$, the pOMS/S80 4 mg/cm$^2$, and the pOMS/S80 6.5 mg/cm$^2$ were shown to be 489, 522, 569 and 634 mAh/cm$^3$, respectively, which increased in proportion to the quantity of supported sulfur in the lithium-sulfur batteries. Also, when the lithium-sulfur batteries were tested at 0.2 C for 200 cycles, the lithium-sulfur batteries had a volumetric capacity retention rate of 71% and 72%, respectively, and also exhibited high cycle stability. Such volumetric capacity and excellent cycle stability are characteristics that cannot be obtained from conventional porous carbon bodys, and the most results obtained using the porous carbon body as the host material showed that the lithium-sulfur batteries had a volumetric capacity of less than 450 mAh/cm$^3$, but the lithium-sulfur battery prepared in Example 2 had excellent characteristics in that the lithium-sulfur battery had a volumetric capacity of 450 mAh/cm$^3$ or more, particularly a volumetric capacity of 480 mAh/cm$^3$ or more, and more particularly a volumetric capacity of 630 mAh/cm$^3$ or more. Further, the lithium-sulfur battery of Example 2 may also have an areal capacity of 2.1 mAh/cm$^2$ or more, particularly an areal capacity of 2.9 mAh/cm$^2$ or more, and more particularly an areal capacity of 5.31 mAh/cm$^2$ or more.

FIG. 12 is a diagram showing an electrochemical reaction of the lithium-sulfur battery including an interlayer according to the charge/discharge cycle. FIG. 12A shows the results of electrochemical reaction of the lithium-sulfur battery (a quantity of supported sulfur in the cathode: 2.5 mg/cm$^2$), which includes a porous silica layer as the interlayer prepared in Example 4, according to the charge/discharge cycle. The charge/discharge cycle is measured at a scan rate of 0.2 mV/s for 10 cycles in a voltage range of 1.8 to 2.7 V. As shown in FIG. 12A, the lithium-sulfur battery of Example 4 (including the interlayer) had little change in CV peak intensity for 10 cycles. It can be seen that these results were superior to the results of electrochemical reaction of the lithium-sulfur battery prepared in Example 2 as shown in FIG. 9A according to the charge/discharge cycle. Therefore, it is suggested that, although the lithium-sulfur battery prepared in Example 4 is a solid, pure sulfur electrode in which a porous inorganic insulator host is not used as the interlayer, the lithium-sulfur battery of Example 4 has a remarkably enhanced durability, compared to the lithium-sulfur battery including the porous silica-sulfur composite prepared in Example 2, because the lithium-sulfur battery of Example 4 included the interlayer.

Figure 12A:
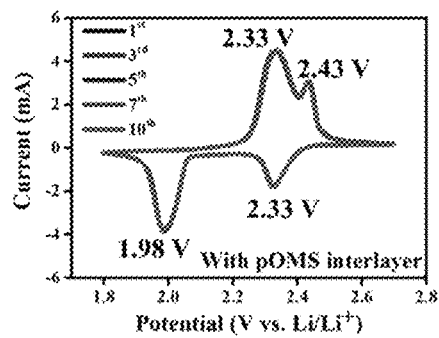
FIGS. 12A-12E are diagrams showing an electrochemical reaction of a lithium-sulfur battery including an interlayer according to the charge/discharge cycle.
Figure 12B:
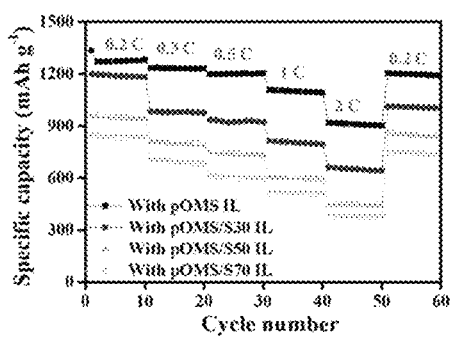

FIG. 12B is a diagram showing the rate capability. The lithium-sulfur batteries prepared in Example 3 (pOMS/S30 IL, pOMS/S50 IL, and pOMS/S70 IL in the drawing) and Example (pOMS IL in the drawing) were discharged/charged for 10 cycles with a current density increasing from 0.2 C to 2 C and a current density decreasing to 0.2 C. As shown, the pOMS IL (total quantity of supported sulfur: 2.5 mg/cm$^2$) had an initial specific capacity at 0.2 C of 1,336 mAh/g, but had a specific capacity at 0.3 C of 1,235 mAh/g, a specific capacity at 0.5 C of 1,198 mAh/g, a specific capacity at 1 C of 1,107 mAh/g, and a specific capacity at 2 C of 918 mAh/g, and also had a specific capacity of 1,205 mAh/g when the specific capacity was restored to 0.2 C, which was shown to be 90% with respect to the initial capacity. The pOMS/S30 IL (total quantity of supported sulfur: 4.5 mg/cm$^2$) had an initial specific capacity at 0.2 C of 1,200 mAh/g, but had a specific capacity at 0.3 C of 1,107 mAh/g, a specific capacity at 0.5 C of 1,053 mAh/g, a specific capacity at 1 C of 915 mAh/g, and a specific capacity at 2 C of 742 mAh/g, and also had a specific capacity at 1,070 mAh/g when the specific capacity was restored to 0.2 C, which was shown to be 89% with respect to the initial capacity. The pOMS/S50 IL (total quantity of supported sulfur: 7.5 mg/cm$^2$) had an initial specific capacity at 0.2 C of 957 mAh/g, but had a specific capacity at 0.3 C of 811 mAh/g, a specific capacity at 0.5 C of 748 mAh/g, a specific capacity at 1 C of 607 mAh/g, and a specific capacity at 2 C of 448 mAh/g, and also had a specific capacity of 838 mAh/g when the specific capacity was restored to 0.2 C, which was shown to be 87% with respect to the initial capacity. The pOMS/S70 IL (total quantity of supported sulfur: 10 mg/cm$^2$) had an initial specific capacity at 0.2 C of 847 mAh/g, but had a specific capacity at 0.3 C of 710 mAh/g, a specific capacity at 0.5 C of 612 mAh/g, a specific capacity at 1 C of 516 mAh/g, and a specific capacity at 2 C of 387 mAh/g, and also had a specific capacity of 732 mAh/g when the specific capacity was restored to 0.2 C, which was shown to be 86% with respect to the initial capacity. From the results, it can be seen that an increase in the total quantity of supported sulfur in the lithium-sulfur battery resulted in an increased quantity of sulfur eluted during the discharging of the lithium-sulfur battery, thereby causing a decrease in specific capacity retention rate.

Figure 12C:
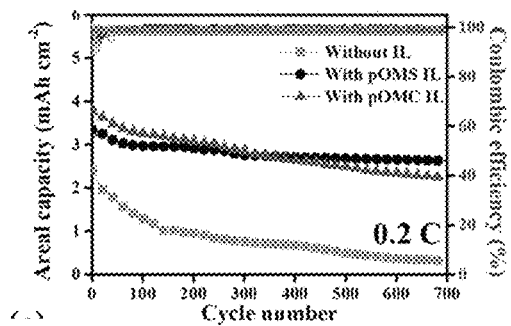
Figure 12D:
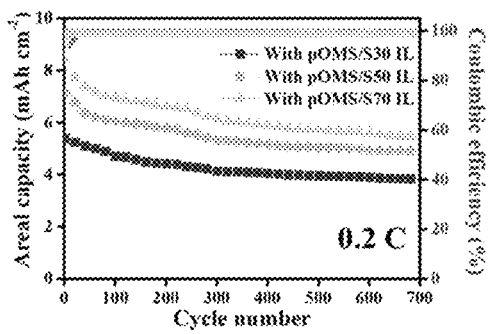
Figure 12E:
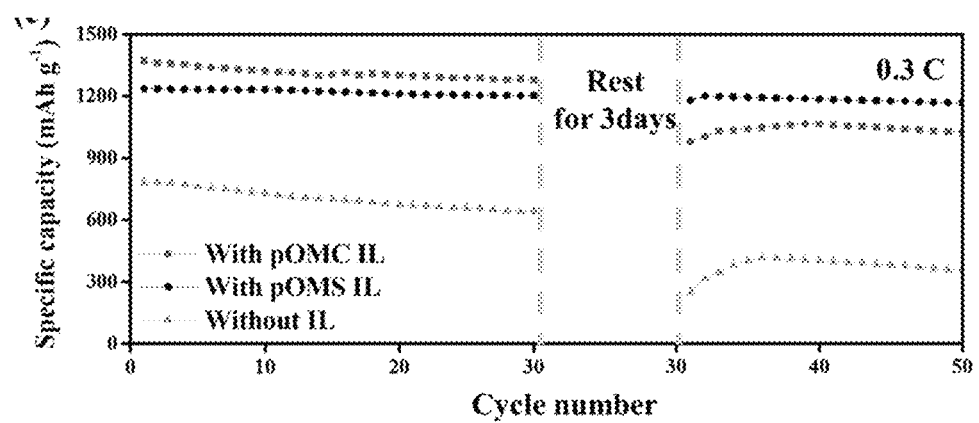

FIGS. 12C to 12E are diagrams showing the cycle capability under various conditions. FIG. 12C shows the results of performing an experiment on each of the lithium-sulfur batteries prepared in Example 4, Comparative Examples 1 and 2, in which a quantity of supported sulfur in the cathode was 2.5 mg/cm$^2$, for 700 cycle at 0.2 C so as to test the long-term cycle stability of the lithium-sulfur battery, in which an electrode including only solid sulfur was used as the cathode without using the mesoporous silica as the host, according to the presence of the interlayer of the lithium-sulfur battery and the type of the interlayer. The lithium-sulfur battery not including the interlayer (Comparative Example 1) had an initial areal capacity of 2.4 mAh/cm$^2$, and an areal capacity of 0.32 mAh/cm$^2$ after 700 cycles, and thus had a retention rate of 13%. The lithium-sulfur battery including the porous silica interlayer (Example 4) had an initial areal capacity of 3.34 mAh/cm$^2$ after 700 cycles, and an areal capacity of 2.62 mAh/cm$^2$, and thus had a retention rate of 13%. The lithium-sulfur battery including the mesoporous carbon interlayer (Comparative Example 2) had an initial areal capacity of 3.78 mAh/cm$^2$, which was higher than that of the battery including the mesoporous silica interlayer, but had an areal capacity of 2.21 mAh/cm$^2$ after 700 cycles, and thus had a retention rate of 59%, which was lower than that of the battery including the porous silica interlayer (Example 4). As can be seen from the results, it was confirmed that the lithium-sulfur battery including the interlayer exhibited superior capacity retention rate and significant areal capacity, compared to the lithium-sulfur battery not including the interlayer. This suggests that, when the lithium-sulfur battery includes the interlayer, the lithium-sulfur battery has high cycle stability and excellent discharge capacity. Also, the lithium-sulfur battery including the mesoporous silica interlayer had an initial areal capacity lower than the lithium-sulfur battery including the mesoporous carbon interlayer, but the areal capacity was reversed after 350 cycles because the non-polar mesoporous carbon had a weaker interaction with polysulfide, compared to the polar mesoporous silica. Therefore, it is suggested that the lithium-sulfur battery including the mesoporous silica interlayer reduce the loss of the sulfur material because the mesoporous silica interlayer strongly interacted with the polysulfide, thereby dramatically improving long-term performance.

To test the long-term cycle stabilities of the lithium-sulfur batteries (pOMS/S30 IL, pOMS/S50 IL and pOMS/S70 IL), which included the mesoporous silica-sulfur composite prepared in Example 3 as the interlayer, according to the quantity of supported sulfur, an experiment was carried out for 700 cycles at 0.2 C. The results are shown in FIG. 12D. As shown, the pOMS/S30 IL (total quantity of supported sulfur: 4.5 mg/cm$^2$) had an initial areal capacity of 5.4 mAh/cm$^2$, and an areal capacity of 3.82 mAh/cm$^2$ after 700 cycles, and thus had a retention rate of 71%. The pOMS/S50 IL (total quantity of supported sulfur 7.5 mg/cm$^2$) had an initial areal capacity of 7.18 mAh/cm$^2$, and an areal capacity of 4.91 mAh/cm$^2$ after 700 cycles, and thus had a retention rate of 68%. The pOMS/S70 IL (total quantity of supported sulfur 10 mg/cm$^2$) had an initial areal capacity of 8.47 mAh/cm$^2$, and an areal capacity of 5.44 mAh/cm$^2$ after 700 cycles, and thus had a retention rate of 64%. From these results, it can be seen that the areal capacity retention rate of the lithium-sulfur battery decreased and the area capacity of the lithium-sulfur battery increased with an increasing quantity of supported sulfur in the lithium-sulfur battery.

Figure 11A:
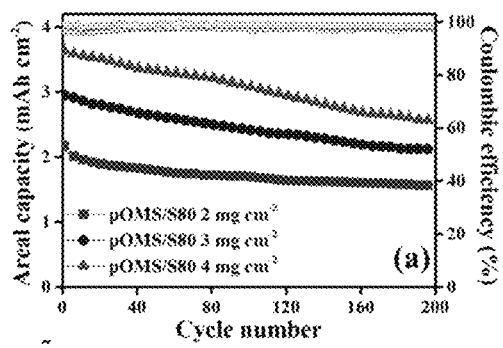
FIGS. 11A-11D are diagrams showing an areal capacity and a volumetric capacity of the lithium-sulfur batteries prepared in Example 2 and Comparative Example 1.
Figure 11B:
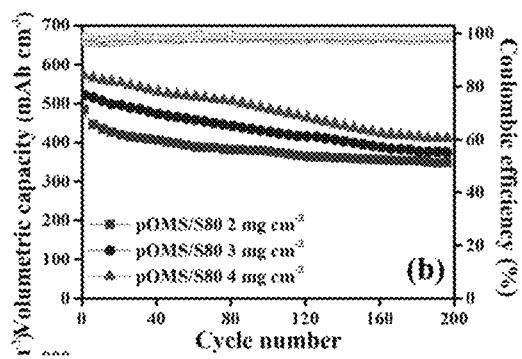
Figure 11C:
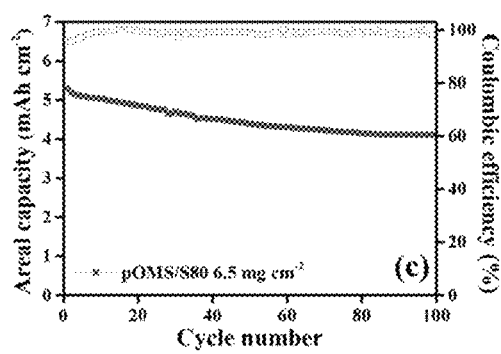
Figure 11D:
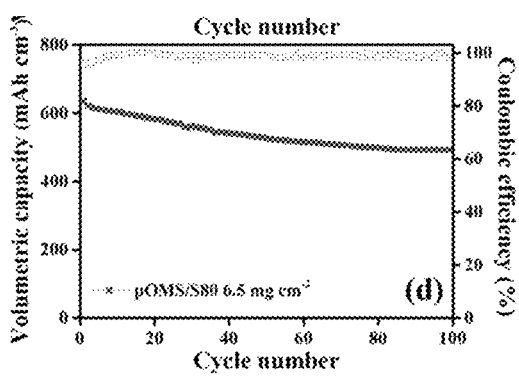

To compare the long-term stability of the lithium-sulfur battery of Example 2, which included the porous silica-sulfur composite as the cathode and did not include the interlayer, to the long-term stability of the lithium-sulfur battery of Example 3, which included sulfur as the cathode and included the mesoporous silica-sulfur composite as the interlayer, FIG. 11A was compared to FIG. 12D. For the comparison, the areal capacities and areal capacity retention rates after 200 cycles were compared in the same manner. The results are listed in Table 5. From the results, it can be seen that the lithium-sulfur battery of Example 3 had a high areal capacity value and areal capacity retention rate, compared to the lithium-sulfur battery of Example 2. Therefore, when the sulfur was further included in the mesoporous silica interlayer, the lithium-sulfur battery maintained higher areal capacity compared to the lithium-sulfur battery in which the mesoporous silica interlayer was not used during the long-term cycles (i.e., 700 cycles or more), and exhibited excellent long-term stability cycles. Therefore, it is suggested that, when the mesoporous silica or the mesoporous silica-sulfur composite interlayer was included in the lithium-sulfur battery, the lithium-sulfur battery further inhibited the loss of sulfur and realized excellent capacity during the charge/discharge cycle.

TABLE 5

| Classification | | Initial areal capacity (mAh/cm$^2$) | Areal capacity after 200 cycles (mAh/cm$^2$) | Retention rate (%) |
|---|---|---|---|---|
| Example 2 | pOMS/S80 2 mg/cm$^2$ | 2.18 | 1.57 | 72 |
| | pOMS/S80 3 mg/cm$^2$ | 2.95 | 2.12 | 72 |
| | pOMS/S80 4 mg/cm$^2$ | 3.63 | 2.57 | 71 |
| Example 3 | pOMS/S30 IL 4.5 mg/cm$^2$ | 5.4 | 4.42 | 82 |
| | pOMS/S50 IL 7.5 mg/cm$^2$ | 7.18 | 5.79 | 81 |
| | pOMS/S70 IL 10 mg/cm$^2$ | 8.47 | 6.63 | 78 |

In FIG. 12E, each of the lithium-sulfur batteries prepared in Example 4 and Comparative Examples 1 and 2 was tested by charging/discharging the lithium-sulfur battery for 50 cycles at 0.3 C and taking breaks of 3 days between the cycles (after 30 cycles) so as to check an effect of the interlayer on self-discharging occurring in the lithium-sulfur batteries. The lithium-sulfur battery not including the interlayer (a quantity of supported sulfur in the cathode: 2.5 mg/cm$^2$, and a pure sulfur:ketjen black:polyethyleneoxide weight ratio: 70:20:10 in the case of Comparative Example 1) had a specific capacity of 640 and 250 mAh/g before and after the break of 3 days, respectively, and thus had a specific capacity retention rate of 39%. The lithium-sulfur battery including the mesoporous carbon interlayer (Comparative Example 2) had a specific capacity of 1,279 and 976 mAh/g before and after the break of 3 days, respectively, and thus had a specific capacity retention rate of 76%. The lithium-sulfur battery including the mesoporous silica interlayer (Example 4) had a specific capacity of 1,203 and 1,180 mAh/g before and after the break of 3 days, respectively, and thus had a specific capacity retention rate of 98%. As can be seen from the results, it was confirmed that the lithium-sulfur battery not including the interlayer (Comparative Example 1) had a very low specific capacity retention rate because the polysulfide generated during the discharging of the lithium-sulfur battery was eluted, diffused into the lithium electrode (an anode), and adsorbed to the lithium electrode, and the polysulfide adsorbed to the lithium electrode in this way was self-discharged, resulting in degraded performance of the whole lithium-sulfur battery. However, the lithium-sulfur battery including the interlayer (Example 4) may reduce the diffusion of the polysulfide into the lithium electrode, thereby suppressing the self-discharging of the lithium-sulfur battery. In particular, it can be seen that the lithium-sulfur battery including the mesoporous silica interlayer (Example 4) had little decrease in the specific capacity even after the break of 3 days, and thus the mesoporous silica interlayer included in the lithium-sulfur battery may significantly suppress the self-discharging of the lithium-sulfur battery. This is because the mesoporous silica may have higher polarity than the mesoporous carbon, thereby further suppressing the self-discharging of the lithium-sulfur battery.

Figure 13A:
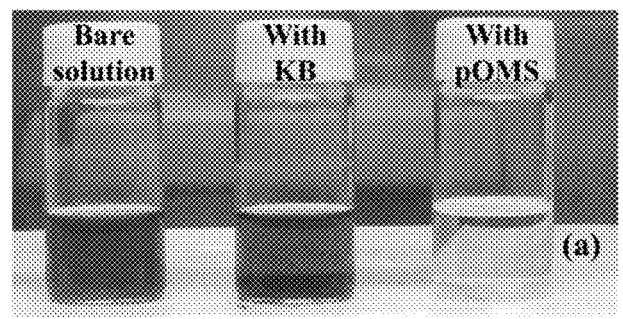
FIGS. 13A-13B show the experimental results of adsorption of a soluble lithium polysulfide to mesoporous silica and a porous carbon body.
Figure 13B:
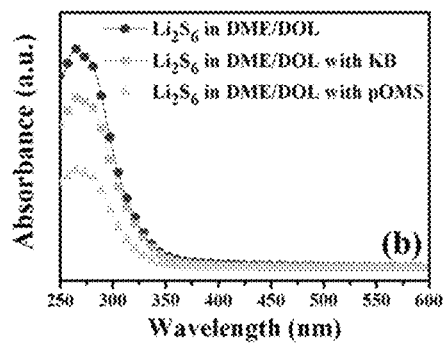

FIG. 13 shows the experimental results of adsorption of soluble lithium polysulfide to mesoporous silica (pOMS in the drawing) and a mesoporous carbon body (ketjen black, KB in the drawing). A solution, in which $Li_2S_6$ that was one of the lithium polysulfides was dissolved in a mixed solvent of 1,3-dioxolane (DOL) and 1,2-dimethoxyethane (DME) which were mixed at a volumetric ratio of 1:1, was prepared, and the porous silica prepared in Preparation Example 1 and ketjen black carbon having a high surface area (1,250 m$^2$/g) were added as the host materials at the same quantity so that the lithium polysulfide was adsorbed to the two host materials to observe a change in colors. From the experimental results, it can be seen that the ketjen black carbon host had little change in colors, but the mesoporous silica showed a transparent color, indicating that the lithium polysulfide was more excellently adsorbed to the porous silica. From the results of UV-Vis spectrum measurement, it can be seen that a concentration of the residual lithium polysulfide solution was lower in the case of the mesoporous silica. In this way, when the mesoporous silica was used as the host of sulfur in the lithium-sulfur battery, the silica was able to absorb a larger quantity of sulfur through a more potent interaction with the polysulfide, thereby minimizing the loss of sulfur as the active material.

Figure 14A:
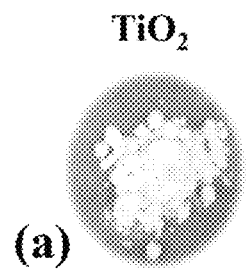

FIG. 14 is a digital image of the porous titania prepared in Preparation Example 2. As shown, the porous titania was prepared to have various colors according to the reducing condition. Specifically, FIG. 14A shows pure porous titania ($TiO_2$) having a white color before Mg reduction, FIG. 14B shows $TiO_{2-x}$ ($TiO_2$:Mg 1:0.3, at 650° C. for 5 hours) having a yellow color, FIG. 14C shows TiO-5h (TiO$_2$:Mg 1:1, at 650° C. for 5 hours) having a grey color, and FIG. 14D shows TiO-8h (TiO$_2$:Mg 1:1, at 650° C. for 8 hours) having a black color.

Figure 15A:
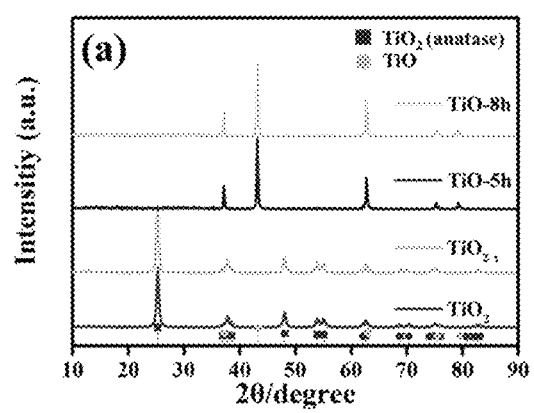
FIG. 15A is a diagram showing X-ray diffraction (XRD) patterns of porous titania composites.
Figure 15B:
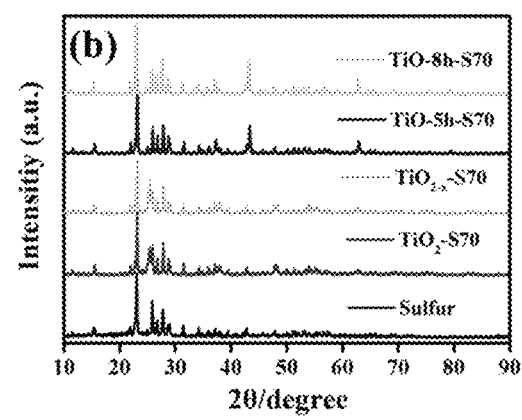
FIG. 15B is a diagram showing X-ray diffraction (XRD) patterns of the porous titania-sulfur composites.

FIG. 15A is a diagram showing X-ray diffraction (XRD) patterns of the porous titania composites prepared in Preparation Example 2. As shown, it can be seen that, because TiO$_2$ and TiO$_{2-x}$ had an anatase structure having a band gap of 3.2 eV, the TiO$_{2-x}$ were not structurally changed during an Mg reduction process. However, referring to FIG. 14B, the color of the TiO$_{2-x}$ was changed to yellow by means of the reduction, indicating that the surfaces of TiO$_2$ particles were changed by means of the reduction. Also, it can be seen that the TiO-5h and TiO-8h had new structures because the molar ratio of Mg to TiO$_2$ was considered to increase. FIG. 15B is a diagram showing X-ray diffraction (XRD) patterns of the porous titania-sulfur composites (TiO$_2$—S70, TiO$_{2-x}$—S70, TiO-5h-S70, and TiO-8h-S70) prepared in Example 5. As shown, it can be seen that the sulfur was well preserved in the form of crystals because a number of peaks derived from the crystals of sulfur were observed at they are.

Figure 16:
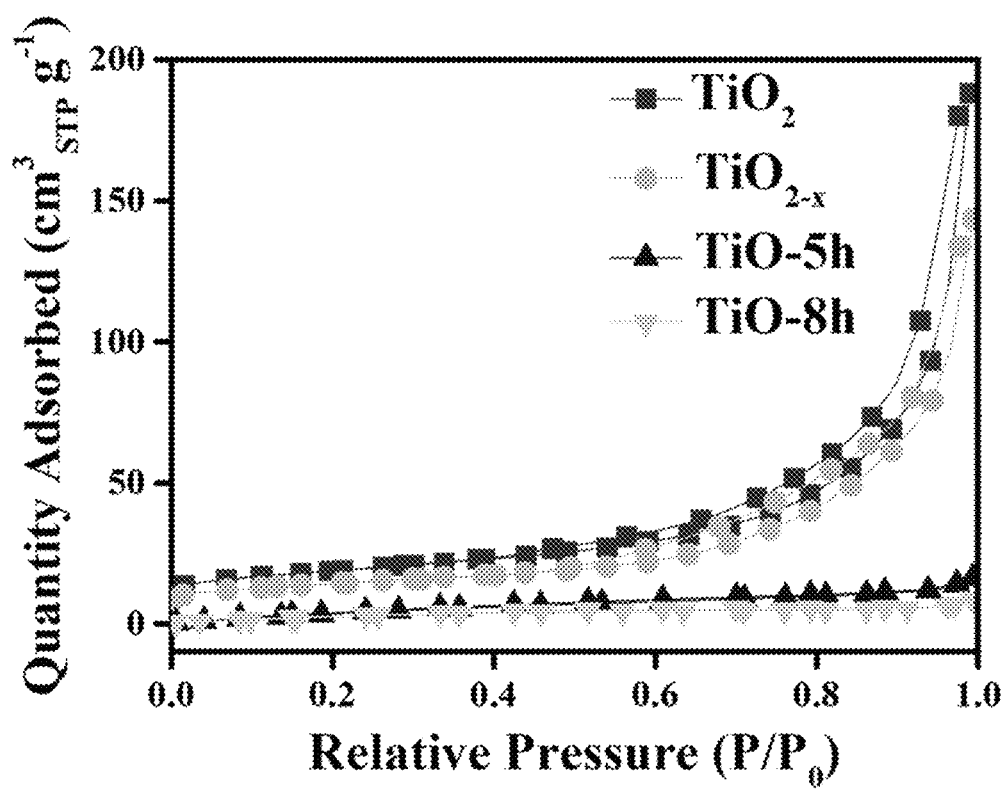
FIG. 16 is a diagram showing nitrogen adsorption-desorption isotherms of the porous titania.

FIG. 16 is a diagram showing nitrogen adsorption-desorption isotherms of porous titania (TiO$_2$, TiO$_{2-x}$, TiO-5h, and TiO-8h). As can be seen from the results, it can be seen that the pure porous titania (TiO$_2$) before Mg reduction had a specific surface area of 66 m$^2$/g, a micropore volume of 0.0066 cm$^3$/g, and a mesopore volume of 0.3018 cm$^3$/g, and TiO$_{2-x}$, TiO-5h, and TiO-8h generated after the Mg reduction process have a specific surface area of 51, 18, and 12 m$^2$/g, a micropore volume of 0.0062, 0.0053, and 0.0050 cm$^3$/g, and a mesopore volume of 0.2382, 0.0341, and 0.0185 cm$^3$/g, respectively. The results are shown in Table 6. From the results, it can be seen that the specific surface area, the micropore volume, and the mesopore volume increased with an increasing Mg content with respect to TiO$_2$ or an increasing Mg reduction time. This is because nanoparticles agglomerated together during the Mg reduction process to decrease the specific surface area, the micropore volume, and the mesopore volume. In this way, it will be expected that the sulfur is mainly formed on a surface of the porous titania.

TABLE 6

| Classification | Specific surface area (m$^2$/g) | Micropore volume (cm$^3$/g) | Mesopore volume (cm$^3$/g) |
|---|---|---|---|
| TiO$_2$ | 66 | 0.0066 | 0.3018 |
| TiO$_{2-x}$ | 51 | 0.0062 | 0.2382 |
| TiO-5 h | 18 | 0.0053 | 0.0341 |
| TiO-8 h | 12 | 0.0050 | 0.0185 |

Figure 17:
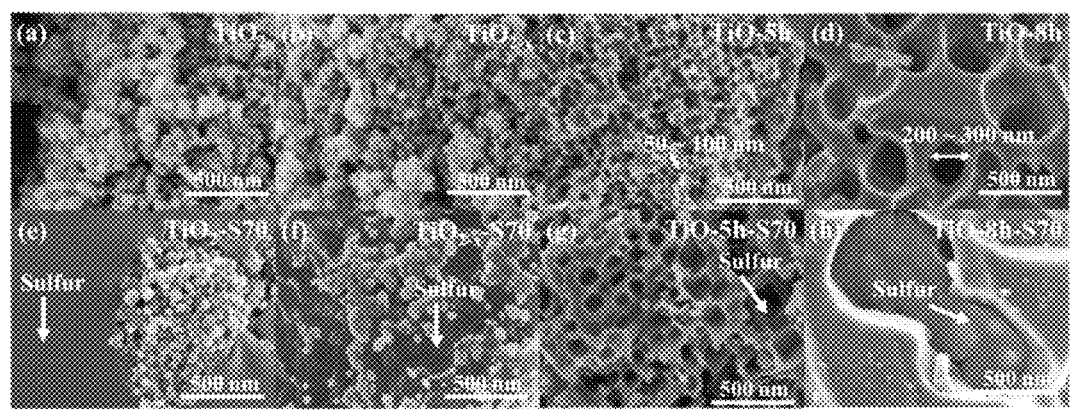
FIG. 17 is a diagram showing images of the porous titania and the porous titania-sulfur composites observed using the scanning electron microscope.
Figure 18A:
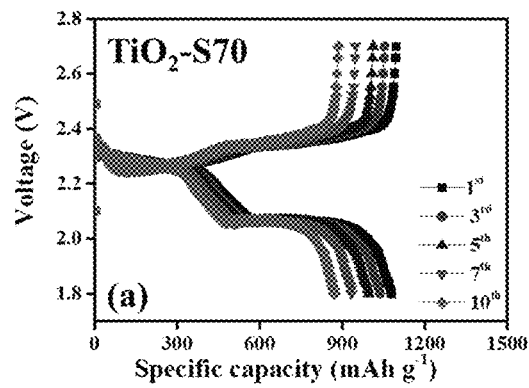
FIGS. 18A-18D are diagrams showing an electrochemical reaction of a lithium-sulfur battery, which includes a cathode of a porous titania-sulfur composite prepared in Example 6, according to the galvanostatic charge/discharge cycle.
Figure 18B:
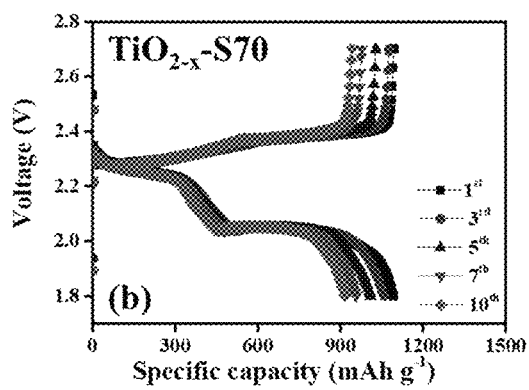
Figure 18C:
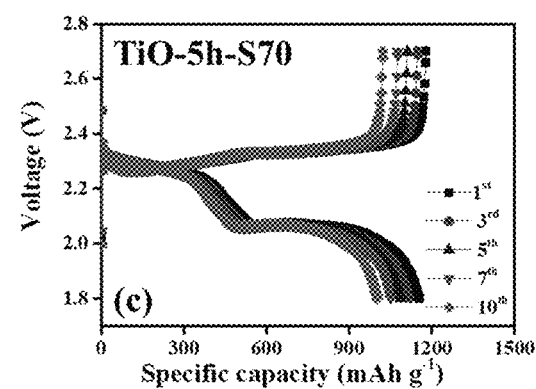
Figure 18D:
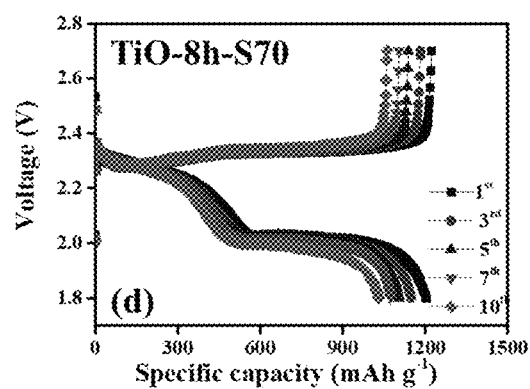

FIG. 17 is a diagram showing an image of the porous titania (TiO$_2$, TiO$_{2-x}$, TiO-5h, and TiO-8h) and porous titania-sulfur composite (TiO$_2$—S70, TiO$_{2-x}$—S70, TiO-5h-S70, and TiO-8h-S70), as observed using the scanning electron microscope. As shown, it can be seen that TiO$_2$ (A) and TiO$_{2-x}$ (B) were composed of typical nano-sized particles. Also, it can be seen that TiO-5h (C) and TiO-8h (D), which were reduced with an increasing content of Mg, had a mesh-shaped porous structure having macropores generated therein. Such macropores were formed while depriving Mg of oxygen in TiO$_2$ nanoparticles during an Mg reduction process and allowing the TiO$_2$ nanoparticles to chemically agglomerate together to form large titania particles, and simultaneously removing the generated MgO through an etching process. As result, it can be seen that the porous titania had larger macropores because the size of the MgO particles increased with an increasing reduction process time. On the other hand, in terms of the porous titania-sulfur composites in which sulfur was supported in the porous titania, that is, TiO$_2$—S$_{70}$ (E), TiO$_{2-x}$—S70 (F), TiO-5h-S70 (G), and TiO-8h-S70 (H), it can be seen that the sulfur was mainly formed on a surface of the porous titania. As shown in FIG. 16, these results contemplated that the sulfur was not diffused into the porous titania but formed on a surface of the porous titania because the porous titania had a low specific surface area and pore volume.

FIG. 18 is a diagram showing an electrochemical reaction of the lithium-sulfur battery, which includes the porous titania-sulfur composite as the cathode prepared in Example 6, according to the galvanostatic charge/discharge cycle. The discharge capacity was measured in a voltage range of 1.8 to 2.7 V for a total of 10 cycles, and a galvanostatic charge/discharge test was performed by applying a current density of 0.2 C. In this case, the discharge capacity was measured every 1, 3, 5, 7, and 10 cycles. The discharge capacities for each cycle and the discharge capacity retention rates after 10 cycles are compared and summarized in Table 7. As can be seen from the results, it was confirmed that the lithium-sulfur batteries including the porous titania-sulfur composites (TiO$_{2-x}$—S70, TiO-5h-S70 and TiO-8h-S70), which were subjected to Mg reduction, as the cathode had a higher discharge capacity and retention rate, compared to the lithium-sulfur battery including the porous titania-sulfur composite (TiO$_2$—S70), which were not subjected to the Mg reduction, as the cathode. It is contemplated that the electrical conductivity was improved due to the structural defects caused by the deficiency of oxygen in the porous titania-sulfur composite formed through the Mg reduction, and thus the discharge capacity was improved due to the easy electron transfer reaction. Also, it is contemplated that the porous titania-sulfur composite had a higher retention rate because the structural defects caused by the deficiency of oxygen was able to be caused to prevent the elution and diffusion of the polysulfide.

TABLE 7

| | 1$^{st}$ (Specific capacity) (mAh/g) | 3$^{rd}$ (Specific capacity) (mAh/g) | 5$^{th}$ (Specific capacity) (mAh/g) | 7$^{th}$ (Specific capacity) (mAh/g) | 10$^{th}$ (Specific capacity) (mAh/g) | Specific capacity retention rate (%) |
|---|---|---|---|---|---|---|
| TiO$_2$-S70 | 1,078 | 1,036 | 996 | 932 | 870 | 80 |
| TiO$_{2-x}$-S70 | 1,092 | 1,057 | 1,009 | 956 | 918 | 84 |
| TiO-5 h-S70 | 1,154 | 1,119 | 1,086 | 1,051 | 1,001 | 87 |
| TiO-8 h-S70 | 1,203 | 1,148 | 1,104 | 1,073 | 1,031 | 86 |

The porous inorganic insulator-sulfur composite according to one embodiment of the present invention has a high pore volume because the porous inorganic insulator-sulfur composite has well-developed mesopores, and thus has advantages in that the porous inorganic insulator-sulfur composite allows smooth material movement of sulfur, and can stably support a large quantity of sulfur in the mesopores of silica through a simple infiltration process.

Also, the porous inorganic insulator-sulfur composite according to one embodiment of the present invention does not include a carbon-based material (e.g., a carbon body) and a metal oxide, and simultaneously can have a potent interaction with sulfur, and thus has an advantage in that, when the porous inorganic insulator-sulfur composite is used as a cathode of the lithium-sulfur battery or an interfacial layer between the cathode and the separator, the loss of sulfur can be minimized even when the lithium-sulfur battery is repeatedly charged and discharged.

In addition, the porous inorganic insulator-sulfur composite according to one embodiment of the present invention has an advantage in that the porous inorganic insulator-sulfur composite can have further improved lifetime characteristics and exhibit flexibility due to the material characteristics of the porous inorganic insulator, thereby allowing the design of a flexible lithium-sulfur battery.

Additionally, the porous inorganic insulator-sulfur composite according to one embodiment of the present invention has an advantage in that the porous inorganic insulator-sulfur composite can be easily and economically prepared using a simple preparation process, thereby realizing a high lithium-sulfur battery having high economic feasibility.

Moreover, the porous inorganic insulator-sulfur composite according to one embodiment of the present invention has an advantage in that the porous inorganic insulator-sulfur composite has high energy density and high areal capacity, and thus a lithium-sulfur battery having high energy density and areal capacity can be realized when the porous inorganic insulator-sulfur composite is used as a cathode of the lithium-sulfur battery or an interfacial layer between the cathode and the separator.

Further, the lithium-sulfur battery according to one embodiment of the present invention has an advantage in that the lithium-sulfur battery has high cycle stability and rate capability.

Although the porous inorganic insulator-sulfur composite and the lithium-sulfur battery have been described in the present invention with reference to certain subject matters and limited examples thereof, and the accompanying drawings, it should be understood that the subject matters and limited examples described herein are merely provided to aid in understanding the present invention more comprehensively, but are not intended to limit the present invention. Therefore, it will be apparent to those skilled in the art to which the present invention belongs that various changes and modifications can be made without departing from the scope of the present invention.

Thus, the scope of the present invention is not intended to be limited to the examples described herein, and thus all types of the appended claims, and equivalents or equivalent modifications thereof come within the scope of the present invention.

What is claimed is:

1. A porous inorganic insulator-sulfur composite comprising:
    a porous inorganic insulator; and
    sulfur supported in pores of the porous inorganic insulator,
    wherein the sulfur is included in an amount of 30 wt % or more with respect to a total weight of the porous inorganic insulator-sulfur composite, and
    wherein the sulfur is included at 0.4 mg/cm$^2$ to 30 mg/cm$^2$ in the pores of the porous inorganic insulator, and
    the porous inorganic insulator has a hexagonal structure in which the pores are distributed in a hexagonal array.

2. The porous inorganic insulator-sulfur composite of claim 1, wherein the porous inorganic insulator has a BET specific surface area of 10 m2/g or more, and comprises mesopores having a diameter of less than 2 to 50 nm or macropores having a diameter of 50 to 3,000 nm.

3. The porous inorganic insulator-sulfur composite of claim 1, wherein the porous inorganic insulator is porous silica or porous titania.

4. The porous inorganic insulator-sulfur composite of claim 1, wherein the sulfur comprises inorganic sulfur (S8), a sulfur-based compound, or a mixture thereof.

5. The porous inorganic insulator-sulfur composite of claim 1, wherein the porous inorganic insulator-sulfur composite has diffraction peaks of the sulfur and the porous inorganic insulator present at a same time in an X-ray diffraction (XRD) pattern using Cu Kα.

6. The porous inorganic insulator-sulfur composite of claim 1, wherein the porous inorganic insulator has a hexagonal flat structure having a thickness of 100 to 3,000 nm.

7. The porous inorganic insulator-sulfur composite of claim 1, wherein the hexagonal structure is a hexagonal flat structure in which a ratio of an in-plane width and a thickness is in a range of 0.01 to 0.2.

8. A cathode for lithium-sulfur batteries comprising:
    a porous inorganic insulator; and
    a porous inorganic insulator-sulfur composite comprising sulfur supported in pores of the porous inorganic insulator,
    wherein the sulfur is included in an amount of 30 wt % or more with respect to a total weight of the porous inorganic insulator-sulfur composite,
    wherein the sulfur is included at 0.4 mg/cm$^2$ to 30 mg/cm$^2$ in the pores of the porous inorganic insulator, and
    wherein the porous inorganic insulator has a hexagonal structure in which the pores are distributed in a hexagonal array.

9. The cathode for lithium-sulfur batteries of claim 8, further comprising a carbon-based conductor.

10. The cathode for lithium-sulfur batteries of claim 9, wherein the porous inorganic insulator-sulfur composite and the carbon-based conductor are included at a weight ratio of 10:10 to 10:0.1.

11. The cathode for lithium-sulfur batteries of claim 8, further comprising a cathode composite layer in which a carbon-based conductor, the porous inorganic insulator-sulfur composite, and a binder are physically mixed and complexed.

12. A lithium-sulfur battery comprising the cathode in claim 8; an anode; an electrolyte; and a separator.

13. The lithium-sulfur battery of claim 12, wherein
    the cathode comprises a current collector and a cathode composite layer formed on the current collector, and
    the cathode composite layer comprises a cathode composite in which a carbon-based conductor, the porous inorganic insulator-sulfur composite, and a binder are physically mixed and complexed.

14. The lithium-sulfur battery of claim 12, wherein the lithium-sulfur battery has a volumetric capacity of 450 mAh/cm$^3$ or more and an areal capacity of 3.5 mAh/cm$^2$ or more.

15. A lithium-sulfur battery comprising a cathode; an anode; an electrolyte; and a separator, wherein the lithium-sulfur battery comprises an interlayer interposed between the cathode and the separator, and the interlayer comprises a porous inorganic insulator and a porous inorganic insulator-sulfur composite comprising sulfur supported in pores of the porous inorganic insulator, wherein the sulfur is included in an amount of 30 wt % or more with respect to a total weight of the porous inorganic insulator-sulfur composite, wherein the sulfur is included at 0.4 mg/cm$^2$ to 30 mg/cm$^2$ in the pores of the porous inorganic insulator, and wherein the porous inorganic insulator has a hexagonal structure in which the pores are distributed in a hexagonal array.

16. The lithium-sulfur battery of claim 15, wherein the interlayer comprises an interlayer composite in which a carbon-based conductor, the porous inorganic insulator-sulfur composite, and a binder are physically mixed and complexed.

17. The lithium-sulfur battery of claim 15, wherein the cathode comprises:

the porous inorganic insulator; and the porous inorganic insulator-sulfur composite comprising sulfur supported in the pores of the porous inorganic insulator.

\* \* \* \* \*